United States Patent [19]
Marquis

[11] Patent Number: 5,930,805
[45] Date of Patent: Jul. 27, 1999

[54] STORAGE AND RETRIEVAL OF ORDERED SETS OF KEYS IN A COMPACT 0-COMPLETE TREE

[75] Inventor: Jean A. Marquis, Pasadena, Calif.

[73] Assignee: Sand Technology Systems International, Inc., Westmont, Canada

[21] Appl. No.: 09/081,866

[22] Filed: May 20, 1998

Related U.S. Application Data

[63] Continuation of application No. 08/565,939, Dec. 1, 1995, Pat. No. 5,758,353.

[51] Int. Cl.$^6$ ...................................................... G06F 17/30
[52] U.S. Cl. ............................................................. 707/201
[58] Field of Search ........................ 707/1–10, 100–104, 707/200–206

[56] References Cited

U.S. PATENT DOCUMENTS

| | | | |
|---|---|---|---|
| 3,596,257 | 7/1971 | Patel | 340/172.5 |
| 4,429,385 | 1/1984 | Cichelli et al. | 705/30 |
| 4,468,728 | 8/1984 | Wang | 707/1 |
| 4,586,027 | 4/1986 | Tsukiyama et al. | 341/95 |
| 4,611,272 | 9/1986 | Lomet | 707/3 |
| 4,677,550 | 6/1987 | Ferguson | 707/3 |
| 4,945,475 | 7/1990 | Bruffey et al. | 707/1 |
| 5,036,457 | 7/1991 | Glaser et al. | 395/500 |
| 5,093,779 | 3/1992 | Sakurai | 707/1 |
| 5,109,336 | 4/1992 | Guenther et al. | 395/425 |
| 5,121,493 | 6/1992 | Ferguson | 707/7 |
| 5,202,986 | 4/1993 | Nickel | 707/3 |
| 5,204,958 | 4/1993 | Cheng et al. | 707/102 |
| 5,210,870 | 5/1993 | Baum et al. | 707/7 |
| 5,249,265 | 9/1993 | Liang | 395/160 |
| 5,274,805 | 12/1993 | Ferguson et al. | 707/7 |
| 5,283,894 | 2/1994 | Deran | 707/1 |
| 5,293,616 | 3/1994 | Flint | 707/3 |
| 5,301,314 | 4/1994 | Gifford et al. | 707/101 |
| 5,303,367 | 4/1994 | Leenstra, Sr. et al. | 707/102 |
| 5,307,486 | 4/1994 | Nakamigawa | 707/2 |
| 5,339,411 | 8/1994 | Heaton, Jr. | 395/600 |
| 5,404,513 | 4/1995 | Powers et al. | 707/102 |
| 5,408,652 | 4/1995 | Hayashi et al. | 707/1 |
| 5,481,702 | 1/1996 | Takahashi | 395/600 |
| 5,497,485 | 3/1996 | Ferguson et al. | 707/1 |
| 5,551,027 | 8/1996 | Choy et al. | 707/201 |
| 5,555,409 | 9/1996 | Leenstra, Sr. et al. | 707/101 |
| 5,557,786 | 9/1996 | Johnson , Jr. | 707/101 |
| 5,561,785 | 10/1996 | Blandy et al. | 395/497.01 |
| 5,561,786 | 10/1996 | Morse | 395/497.01 |
| 5,577,243 | 11/1996 | Sherwood et al. | 395/607 |

OTHER PUBLICATIONS

Aoe, Abstract of "Computer algorithms: key search strategies," IEEE Computer Society Technology Series., 1991, pp. 1–139.

Bender, Abstract of "B–Tree/ISAM file handlers," Micro/Systems Journal: For The Advanced Computer User, Jan./Feb. 1987, pp. 58–60.

Grehan, "If Memory Serves . . . ", vol. 14, Issue 8, Aug. 1989, pp. 279–280, 282, 284 and 337.

Grehan, "Virtually Vitrual Memory", Byte, vol. 15, Issue 9, Sep. 1990, pp. 455–456, 458, 460, 462 and 464.

Biliris, "The Performance of Three Database Storage Structures for Managing Large Objects," AT&T Bell Laboratories, Murray Hill, New Jersey, 1992, pp. 276–285.

(List continued on next page.)

*Primary Examiner*—Buay Lian Ho
*Attorney, Agent, or Firm*—Christie, Parker & Hale, LLP

[57] ABSTRACT

A computer storage system and processing method for indexing and accessing data stored in the computer storage system, comprising a compact multi-way search tree structure. The method employs a B-tree like search algorithm that is independent of key type or key length because all keys in index blocks are encoded by a log2 M bit surrogate, where M is the maximal key length. A buffer consisting of a sorted list of key values can be directly transformed into a representation of a C0-tree.

4 Claims, 21 Drawing Sheets

OTHER PUBLICATIONS

"E–Mail Message to J. Marquis", J. Pfaltz, Aug. 24, 1995.

Fachini, Abstract of "C–Tree Systolic Automata," Theoretical Computer Science, V56, N2, 1988, pp. 155–186.

Hulten, "An index organization for applications with highly skewed access patterns,"5th International Conference on Software Engineering, Mar. 9–12, 1981, pp. 71–78.

Johnson, Abstract of "Treemaps: Visualizing Hierarchical and Categorical Data," University of Maryland, vol. 55/04–B of Dissertation Abstracts International, 1993, pp. 1516–1849.

Kida et al., Abstract of "A topological condition imposed on the natural frequencies of two element kind network," Transactions of the Institute of Electronics and Communication Engineers of Japan, Section E, vol. E60, No. 8, 1977, pp. 417–418.

Donald E. Knuth, "The Art of Computer Programming," Sorting and Searching, vol. 3, 1973, pp. 471–479.

Liu, Abstract of "The distances between unrooted and cyclically ordered trees and their computing methods," IEICE Transactions on Information and Systems, vol. E77–D, No. 10, 1994, pp. 1094–1105.

Normann et al., Abstract of "Recent experience with C–tree – a data management system," Europhysics Conference on Control Systems for Experimental Physics. Proceedings (CERN 90–08), 1990, pp. 167–169.

Orlandic Ratko, "Design, Analysis and Applications of Compact O–Complete Trees,"May 1989, p.1985.

Orlandic et al., "Compact O–Complete Trees," Proceedings of the 14th VLDB Conference, Los Angeles, California, 1988, pp. 372–381.

Orlandic et al. "Analysis of Compact O–Complete Trees: A New Access Method to Large Databases," Lecture Notes in Computer Science, Fundamentals of Computational Theory, International Conference FCT '89, pp. 362–371.

Pfaltz, "The ADAMS Language: A Tutorial and Reference Manual," Department of Computer Science, University of Virginia, Charlottesville, Virginia, Apr. 1993, p. 67.

Pfaltz et al., "Implementing Subscripted Identifiers in Scietific Databases," *Lecture Notes in Computer Science 420,* Springer–Verlag, Berlin, Apr. 3–5, 1990, pp. 80–91.

Smith, Abstract of "New Approaches to Balanced Tree Data Structures (Simple Balanced Search Tree)," Univ. of Louisville , vol. 55/02–B of Dissertation Abstracts International, 1993, pp. 497–617.

Wereluis, Abstract of "C file libs reviewed: Ten packages for file management from C are put through real–world paces to test speed and flexibility," Buyer and Vendor Guide, DBMS v. 4 n. 8, 1991, pp. 70–75.

Ratko Orlandic. "Design Analysis and Applications of Compact O–Complete Trees." 185p, May 1989.

Biliris. "The Performance of Three Database Storage Structures for Managing Large Objects". AT&T Bell Laboratories. Murray Hill New Jersey, pp. 276–285, 1992.

Orlandic. "Design Analysis and Applications of Compact O–Complete Trees." Dissertation. Scool of Engineering and Applied Science. University of Virginia 185p, May, 1989.

Orlandic. "Problems of Content–Based Retrieval in Image Databases." Proceedings Third Symposium on New Generation Knowledge Engineering, Iake Washington, D.C. pp. 374–384, Nov. 1992.

Orlandic, "A High Precision Spatial Access Method Based on a New Linear Representation of Quadress." Preceedings of the ISMM International Conference, Information and Knowledge Management CIKM–92. Baltimore. Maryland, pp. 499–508, Nov. 8–11, 1992.

Orlandic, et al. "Q.–Tree=A Dynamic Structure For Accessing Spatial Objects with Arbitrary Shapes." Institute for Parallel Computation. School of Engineering and Applied Science. University of Virginia. Charlottesville, Virginia. 41p, Dec. 6, 1991.

0-COMPLETE BINARY TREE

FIG. 4b

SEARCH KEYS REPRESENTATIVE OF ACTUAL
DATA ITEMS IN STORAGE DEVICE

| 10000001 | 10101010 | 10110010 | 00001000 | 00100101 | 01000110 | 01000010 | 10101000 |

39

SEQUENTIAL PROCESSING PROCEDURE

LEAF SEARCH PROCEDURE

LEAF INSERT PROCEDURE

BRANCH SEARCH PROCEDURE

FIG. 12 SEARCH DEPTH PROCEDURE

BULK PROCESS PROCEDURE

RESET bK FUNCTION

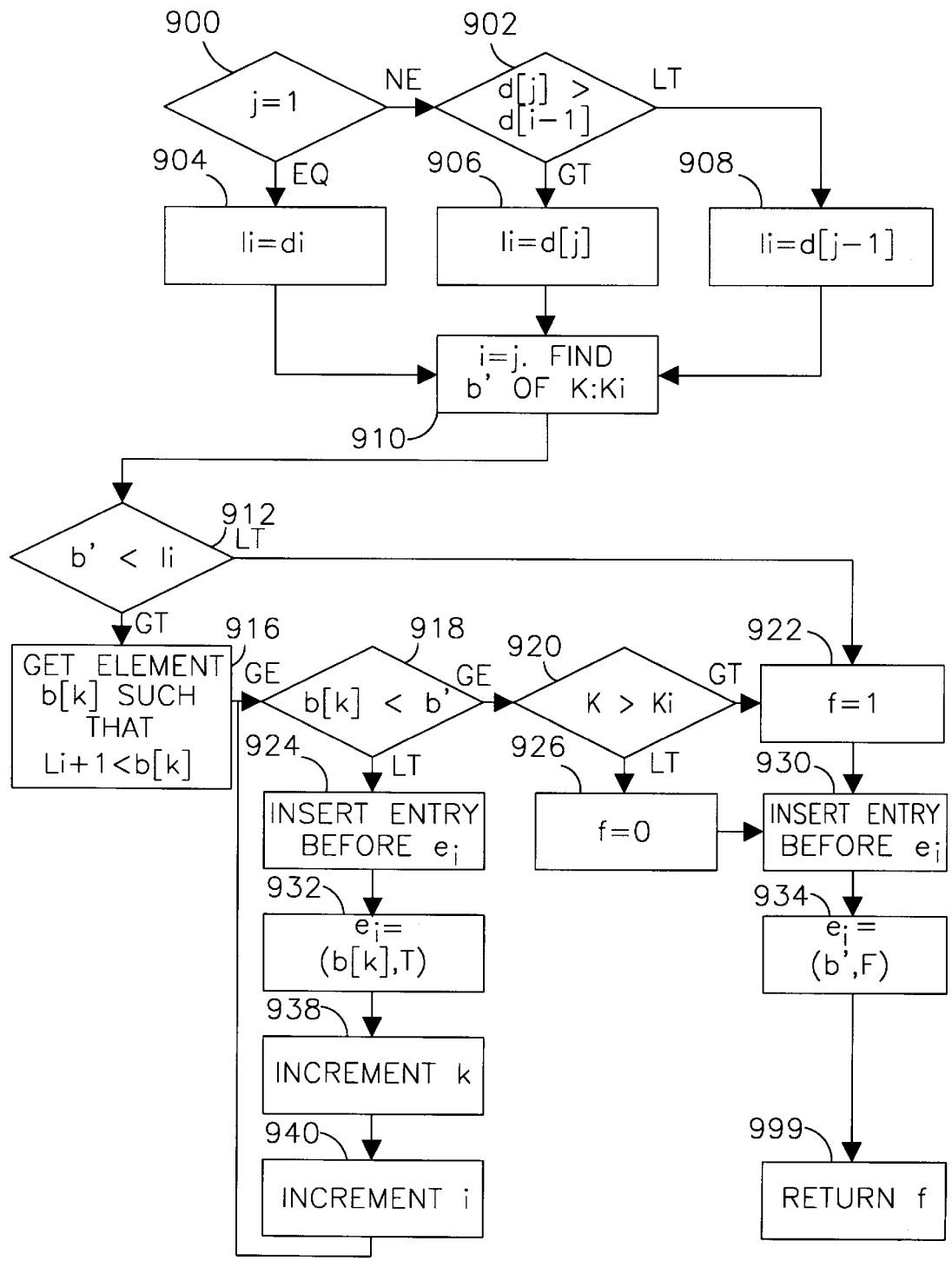

SPLIT ROOT PROCEDURE

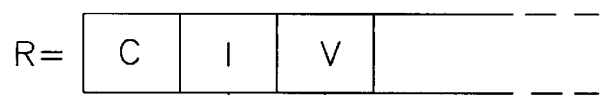
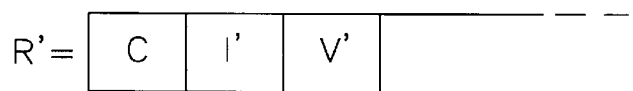
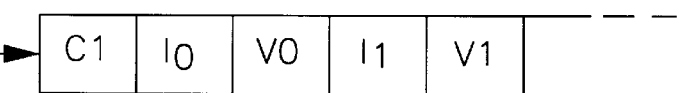

SPLIT CHILD PROCEDURE

MINIMUM DEPTH PROCEDURE

SPLIT NODE PROCEDURE 5,930,805

STORAGE AND RETRIEVAL OF ORDERED SETS OF KEYS IN A COMPACT 0-COMPLETE TREE

CROSS REFERENCE TO RELATED APPLICATION

This application is a continuation of patent application No. 08/565,939 now U.S. Pat. No. 5,758,353 filed Dec. 1, 1995, which is incorporated herein by reference.

FIELD OF THE INVENTION

The invention relates to computer data and file storage systems and to a structure for indexing and accessing data in computer data and file storage systems, and more particularly, to a novel structure for implementing a compact representation of a 0-complete tree and a method of storing and retrieving a set of search keys in such a structure.

BACKGROUND OF THE INVENTION

A recurring problem in data and file storage systems such as a database, in particular those implemented in computer systems, is the search for and location of specific items of information stored in the database. Such searches are generally accomplished by constructing a directory, or index, to the database, and using search keys to search through the index to find pointers to the most likely locations of the information in the database, whether that location is within the memory or the storage medium of the computer.

In its most usual forms, an index to database records within a computer is structured as a tree comprised of one or more nodes, connected by branches, which is stored within a storage means of the computer. Each node generally includes one or more branch fields containing information for directing a search, and each such branch field usually contains a pointer, or branch, to another node, and an associated branch key indicating ranges or types of information that may be located along that branch from the node. The tree, and any search of the tree, begins at a single node referred to as the root node and progresses downwards through the various branch nodes until the nodes containing either the items of information or, more usually, pointers to items of information are reached. The information related nodes are often referred to as leaf nodes or, since this is the level at which the search either succeeds or fails, failure nodes. Within a tree storage structure of a computer, any node within a tree is a parent node with respect to all nodes dependent from that node, and sub-structures within a tree which are dependent from that parent node are often referred to as subtrees with respect to that node.

The decision as to which direction, or branch, to take through a tree storage structure in a search is determined by comparing the search key and the branch keys stored in each node encountered in the search. The results of the comparisons to the branches depending from a given node are to be followed in the next step of the search. In this regard, search keys are most generally comprised of strings of characters or numbers which relate to the item or items of information to be searched for within the computer system.

The prior art contains a variety of search tree data storage structures for computer database systems, among which is the apparent ancestor from which all later tree structures have been developed and the most general form of search tree well known in the art, the "B-tree." (See, for example, Knuth, *The Art of Computer Programming*, Vol. 3, pp. 473–479). A B-tree provides both satisfactory primary access and good secondary access to a data set. Therefore, these trees naturally tend to be used in data storage structure often utilized by database and file systems. Nevertheless, there are problems that exist with the utilization of B-tree storage structures within database systems. Every indexed attribute value must be replicated in the index itself. The cumulative effect of replicating many secondary index values is to create indices which often exceed the size of the database itself. This overhead can force database designers to reject potentially useful access paths. Moreover, inclusion of search key values within blocks of the B-tree significantly decreases the block fan out and increases tree depth and retrieval time.

Another tree structure which can be implemented in computer database systems, compact 0-complete trees (i.e., $C_0$-trees), eliminates search values from indices by replacing them with small surrogates whose typical 8-bit length will be adequate for most practical key lengths (i.e., less than 32 bytes). Thus, actual values can be stored anywhere in arbitrary order, leaving the indices to the tree structure to be just hierarchical collections of (surrogate, pointer) pairs stored in an index block. This organization can reduce the size of the indexes by about 50% to 80% and increases the branching factor of the trees, which provides a reduction in the number of disk accesses in the system per exact match query within computer database systems. (See Orlandic and Pfaltz, *Compact 0-Complete Trees, Proceedings of the 14th VLDB Conference*, pp. 372–381.)

While the known method of creating $C_0$-trees increases storage utilization 50% to 80% over B-trees, there is a waste of storage space due to the presence of dummy entries (surrogate, pointer==NIL) wherein the number of index entries at the lowest level of the tree exceeds the actual number of records stored. Therefore, the expected storage utilization of index entries of $C_0$-trees at the lowest tree level is 0.567 versus 0.693 as in the case of B-trees.

Moreover, although B-trees and $C_0$-tree storage structures represent efficient methods of searching for values, both methods require initial generation of the tree data storage structure itself. Neither of these computer storage structures inherently stores information in sorted order.

A tree can be built more efficiently if the key records are initially sorted in the order of their key field, than if records are in random order. Therefore, an efficient computer database system should sort sets of keys first, and then build a tree based on keys extracted at intervals from the sorted keys.

If the values are in sorted ordered, the next key value to be stored is likely within the range of key values for the current leaf index block or subtree. In addition, index block splitting can be deferred until all keys within a given key interval of the current index block are inserted. Therefore, a goal is to build a data storage structure and method which effectively inputs an ordered sort of key records or data items within a key range interval in the most efficient way possible. In particular, the data storage structure and method should reduce wasted storage space and, during input, sort the search keys that access the data items stored within the storage medium or memory of the computer. This goal is to be achieved while simultaneously retaining the merits and taking advantage of the properties of known B-tree and $C_0$-tree computer storage structures.

SUMMARY OF THE INVENTION

In an embodiment of the invention, a data storage structure for minimizing the amount of information required to retrieve stored data within a computer system is comprised of entries for indexing search keys. Each entry comprises a depth value and a data present indicator having two conditions, and a tree structure stored in the computer interconnecting the entries and forming the data storage structure. Search keys may be binary representations of the data records indexed by the data storage structure or may be any other attribute or set of attributes used to look up the data records. The data storage structure further comprises a means for storing a count of each of the entries associated with a search key interval range.

The described embodiment of the present invention includes novel methods for storing, accessing and retrieving data indexed by the tree data storage structure. These methods comprise a method for sequentially processing a number of search keys within the tree structure to perform a predefined function on each search key, a method for locating a search key within the tree structure, a method for storing and indexing information for each search key within the tree structure, and a method for splitting an index block of the present invention.

An embodiment of the present invention also provides additional efficiency with regards to storage utilization beyond the already stated 50% to 80% savings of $C_0$-trees over B-trees. To alleviate the problem of waste created by $C_0$-trees at the lowest levels, a preferred embodiment of the invention replaces storage of the (surrogate, pointer) entries as physically adjacent pairs of values with two separate physical structures within the storage means of the computer, namely: 1) an index block depths structure to a list of the surrogate values including a depth value and a data present structure indicator having two conditions and 2) a pointers structure pointing to a list of every non-NIL pointer value, these being in lexicographic order. In the preferred embodiment of the invention, a NIL pointer of the prior $C_0$-tree data storage structure (i.e., a dummy entry) is represented by a data not present indicator bit in the value of the surrogate itself. The meta-data of each subtree also reflects the count of non-NIL entries for each subtree to accumulate an incremental lexical position for each indexed key within the pointers structure. Since the pointers structure does not contain any NIL pointers, only a bit of storage is necessary to indicate a NIL pointer and minimal meta-data is recorded. Therefore, storage utilization tends to revert back to that which is expected with a B-tree.

Moreover, to eliminate the inefficiency of traversing a multilevel tree structure, the keys to be added to the data storage structure of the preferred embodiment of the present invention are processed as a collection or more than one item in sorted order. In this way, greater locality of reference and reduction in traversal and maintenance of the nodes of the tree (including index block splitting) from the root to the leaf for each key can be realized. By determining if the next key is included in the key interval range of the current index block, processing of a predefined function can continue in the current index block or resume in its parent block. With this new method, splitting of an index block is deferred until all processing of the current block is completed or the block size is at an extreme maximum far greater than the normal threshold, thus, allowing for context retention of the subtree until all relevant keys have been added to that subtree.

Still other embodiments of the present invention will become readily apparent to those skilled in the art from the following detailed description, wherein is shown and described only embodiments of the invention by way of illustration for carrying out the invention. As will be realized, the invention is capable of other and different embodiments and its several details are capable of modifications in various obvious respects, all without departing from the spirit of the invention. Accordingly, the drawings and the detailed description are to be regarded as illustrative in nature and not restrictive.

BRIEF DESCRIPTION OF THE DRAWINGS

The previous descriptions and all of the structures and features of the present invention and its embodiments will become apparent from the following description and accompanying drawings.

FIG. 4b is a detailed diagram of the contents of the storage container of the $C_0$-tree of FIG. 4a.

FIG. 15 is a flow chart of the Add Depth Procedure of the present invention.

FIG. 16b is an illustration of the root level before splitting.

FIG. 16c is an illustration of the root level after splitting occurs.

Like numbers and designations in the drawings refer to like elements.

DETAILED DESCRIPTION

A) Computer System Overview

Figure 1A:
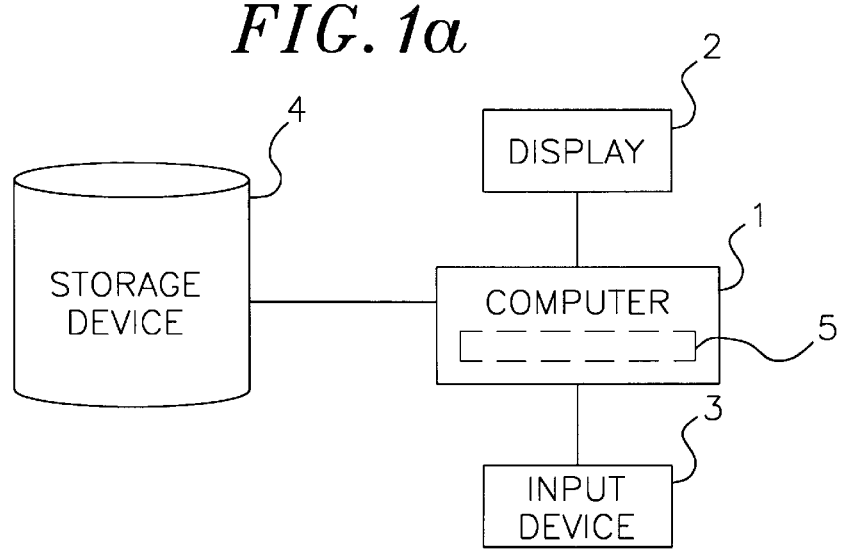
FIG. 1a is a schematic and block diagram of a computer system in which is implemented the present invention.

FIG. 1a depicts a computer system having a programmable computer and computer programs for creating a file system and for processing operations on the file system in accordance with the present invention. The system includes programmable computer 1, display 2, computer input device 3 and a storage means. The storage means comprises a storage device 4 such as a magnetic disk storage system or a partition of memory of the computer for storage of data. Hardware/and software including the file system and hardware/and software for performing processing operations to be described are implemented in a file system 5 (shown in phantom lines), which is connected with computer 1. The system 5 in connection with computer 1 coordinates the various activities related to representing data in the file system and to performing operations on one or more data files stored within the storage device 4. System 5 can be a programmed general purpose computer, such as a personal, mini or mainframe computer, or a special purpose computer formed by one or more integrated chips.

Figure 1B:
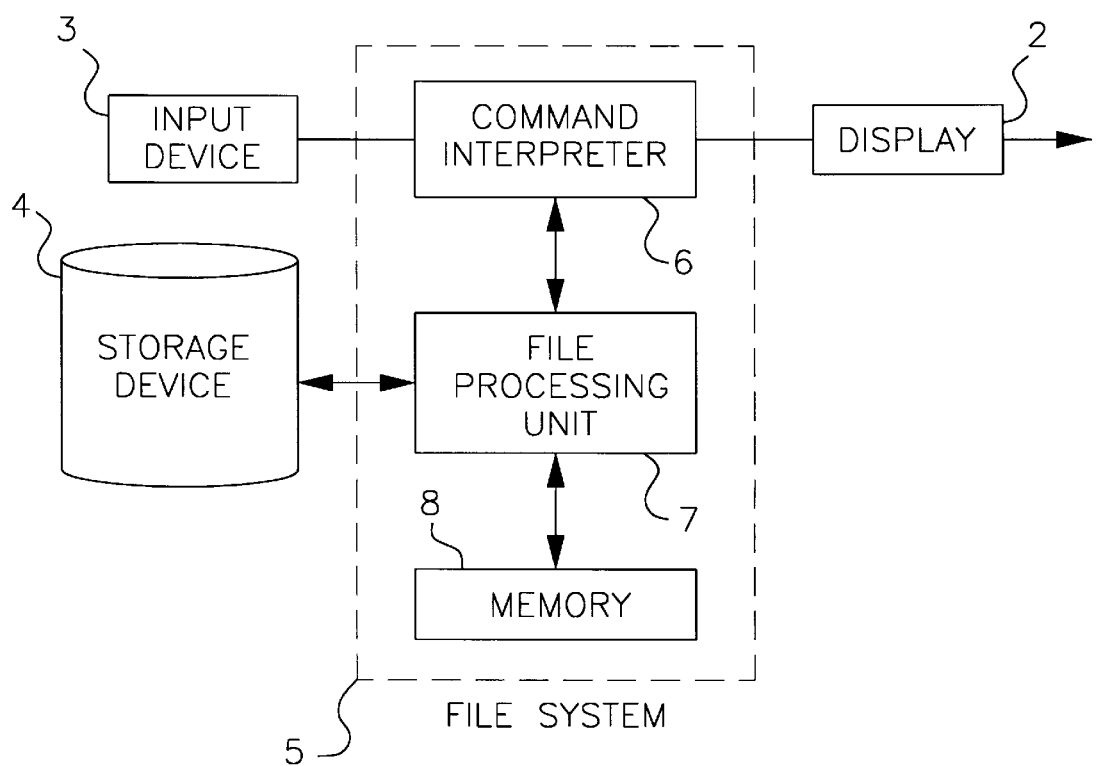
FIG. 1b is a schematic and block diagram of a database system on a computer for implementing the present invention.

Referring to FIG. 1b, file system 5 includes a file processing unit 7 and a command interpreter 6. In order to access specific items of information stored in the computer file system, the file processing unit 7 uses a novel compact 0-complete data storage structure 40 as depicted in FIG. 4 for minimizing the amount of information required to retrieve items of data stored within the storage device 4. The data storage structure has a plurality of entries 30, 31, 80, 81, 82, 83, 84, 85, 86, 87, 88 for indexing search keys 1420, wherein each entry comprises a depth value 89 and a data present indicator 90, the latter, by way of example having two conditions, and a novel $C_0$-tree structure 43 stored in the storage device 4 of the computer interconnecting the entries and forming the data storage structure 40. The data storage structure 40 further includes a means 66 for storing the count of the non-NIL leaf entries associated with a search key interval range. In addition, the present invention uses a separate pointers structure comprised of header 36 and entries 36a, that is distinct from the tree structure 43 and, in a typical embodiment, may be distinct from the data storage structure 40 itself. The pointers structure 36 and 36a accesses the data items within the storage container 39 of the storage device 4.

The described embodiment of the present invention includes novel methods for storing, accessing and retrieving data indexed by the tree data storage structure. These methods include a method for sequentially processing a number of search keys within the tree structure to perform a predefined function on each search key, a method for locating a search key within the tree structure, a method for storing and indexing information for each search key within the tree structure, and a method for splitting an index block of the present invention.

B) Prior Art Tree Structures

Figure 2A:
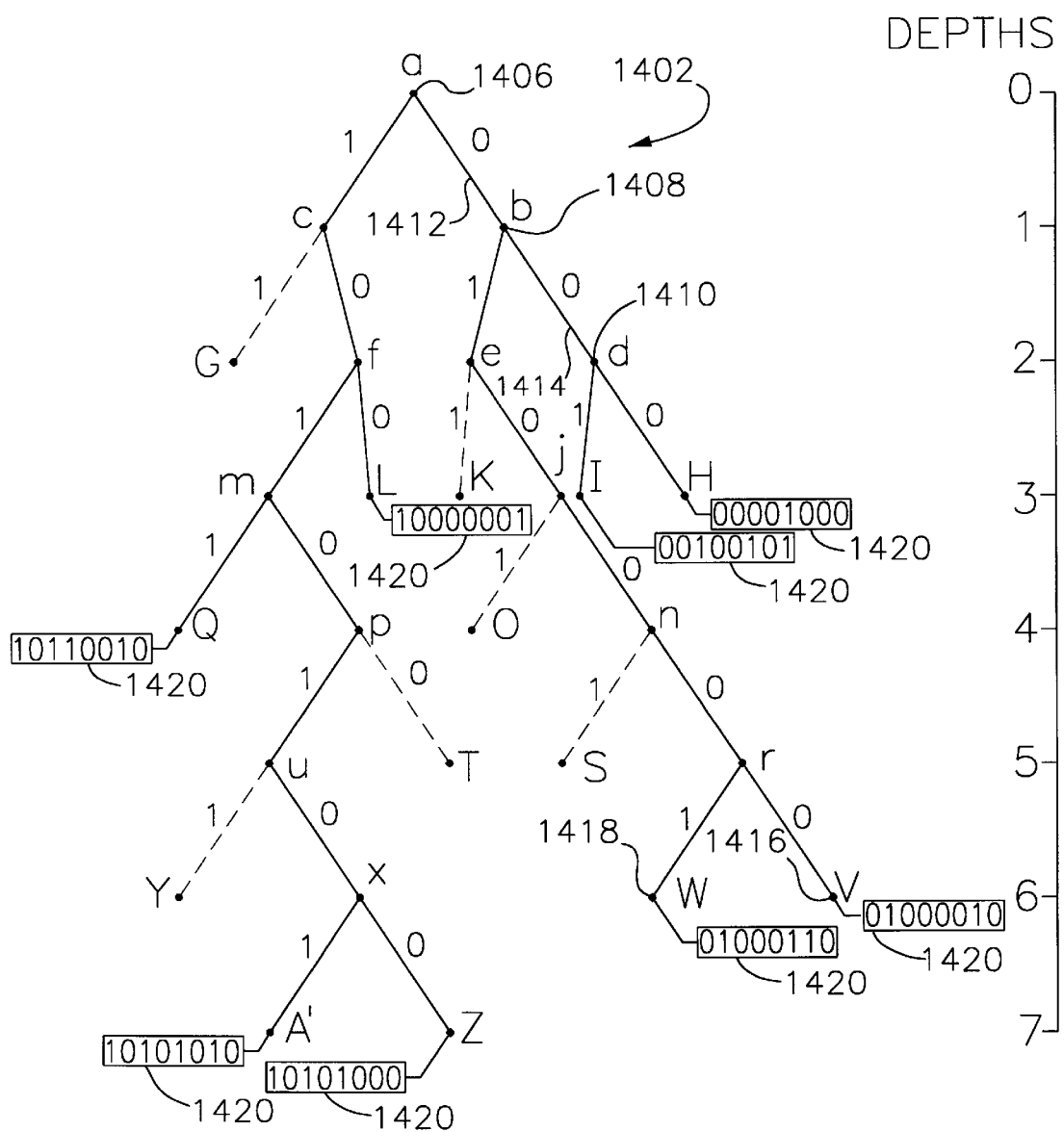
FIG. 2a is a conceptual illustration of a prior art complete binary tree.
Figure 2B:
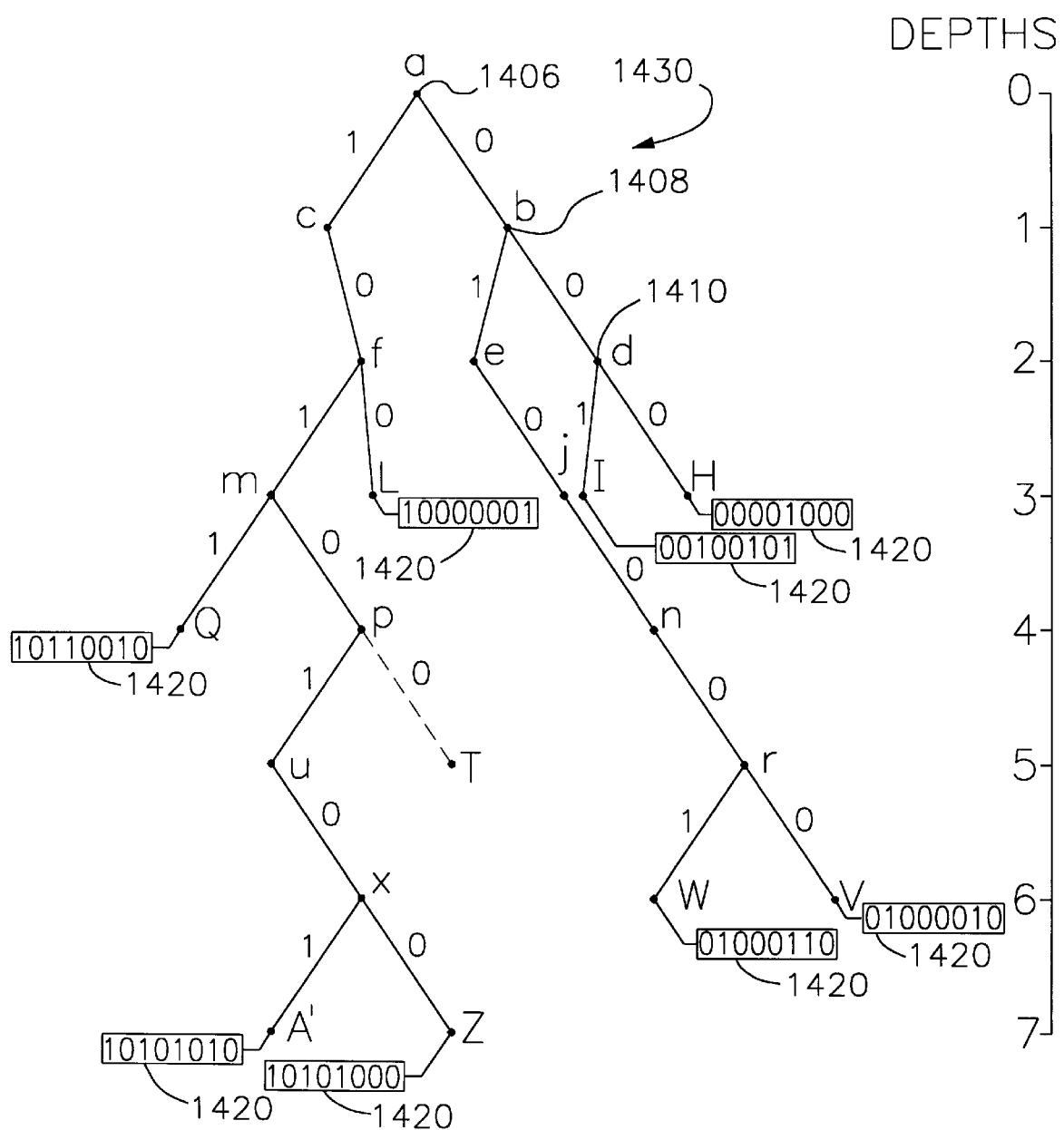
FIG. 2b is a conceptual illustration of a prior art 0-complete binary tree.

Referring now to FIGS. 2a and 2b, there is shown a prior art complete binary tree and a 0-complete binary tree, respectively, and how these trees are used to index data.

1) Complete Binary Tree

Referring to FIG. 2a, binary tree 1402 is an illustrative edge labeled tree data storage structure consisting of nodes indicated by dots, such as 1406, 1408 and 1410, separated by arcs or edges, such as 1412 and 1414. The nodes are identified by small and capital letters a through Z and A'. The end nodes are called leaf nodes or leafs and are labeled with capital letters. All the other interior nodes are labeled with small letters. Information to be retrieved is stored in storage locations pointed to by pointers located at the tree's leaves, such as leaves 1416 and 1418. Search keys 1420 are shown for leaves H, I, V, W, L, Z, A' and Q. In FIG. 2a, the search keys 1420 are strings of binary digits with an arbitrary, uniform length up to some maximum length in bits, 8 bits being used by way of example. The search keys 1420 associated with each of these leaves are used to locate the pointer to the storage location for the corresponding leaf in the storage device 4. Only those leaves indicated by an associated search key 1420 have a pointer to a storage location that stores associated data records and therefore are said to be full. The leaves G, K, O, S, T and Y do not have pointers to a storage location and therefore are said to be empty.

Retrieval of the data records in the storage device 4 is achieved by successively comparing binary 0 and 1 symbols in one of the search keys 1420 with a 0 or 1 edge label on each arc 1412 between the nodes along a path of the connected dots and arcs starting with root node a and ending with the desired leaf. Each node or leaf of the binary tree is either a 0-node or 0-leaf if its entering arc is labeled 0, or a 1-node or 1-leaf if its entering arc is labeled 1. In a computer database and file management system, an access path to a node is a binary string obtained by concatenating the 0 and 1 edge labels traversed from the root node a to the particular node in question.

Binary tree structures are said to be "complete" if every node is either a leaf or is a node that has exactly two non-empty direct descendants (i.e., nodes having a dependent 0-node and a dependent 1-node). In FIG. 2a, each node from node a to node A' satisfies the two conditions for 0-completeness.

Thus, FIG. 2a depicts a tree storage structure with the search keys 1420, including 00001000, 00100101, 01000010, 01000110, 1000001, 10101000, 10101010 and 10110010, to locate data records at leaves H, I, V, W, L, Z, A' and Q respectively. Empty leaves G, K, O, T, S and Y are included within the tree 1402 to fulfill the requirement of a "complete" binary tree.

2) 0-Complete Binary Tree

Refer now to FIG. 2b. A prior art 0-complete binary tree 1430 is shown having the same structure, nomenclature and reference numerals as used in FIG. 2a except where noted. Binary tree 1430 with δ leaves is said to be 0-complete if 1) the sibling of any 0-leaf is present in the tree, and 2) there are exactly δ-1 1-nodes in the tree. Thus, FIG. 2b is a 0-complete binary tree representation of the binary tree of FIG. 2a since every 0-leaf H, V, L, T, Z has a sibling 1-node, and there are nine leaves H, I, V, W, L, T, Z, A' and Q and eight 1-nodes I, W, e, c, m, A', U and Q. The 0-complete tree 1430 is derived from the binary tree 1402 of FIG. 2a by deleting from the tree 1402 those 1-leaves that are empty (indicated by the lack of an associated search key) such as leaves G, K, O, S and Y. Note that deletion of any empty 0-leaf violates the second condition which requires eight 1-nodes in tree 1430, so that node T, even though it is empty, remains in the tree storage structure 1430 and increases required storage space.

Each interior node, designated by small letters, has a corresponding 0-subtree and 1-subtree. The "pre-order traversal" of a 0-complete tree starts at the root node a of the tree and then iterates the following two steps until the last node has been accessed:

1) if the current node $nn_i$ is an internal node then the next node $nn_{i+1}$ in the order will be its 0-son because, by definition of 0-completeness, every interior node must have a 0-son node;

2) if the current node $nn_i$ is a leaf then the next node in the pre-order will be the 1-son of the node pp whose 0-subtree contains $nn_i$ and whose depth is maximal.

Thus, the first node in pre-order is the internal root node a. The next node is its 0-son node b, which is followed by 0-son nodes d and then leaf H. The next node in pre-order is the 1-son of the node d since H is a leaf node and the 0-subtree of node d contains H and its depth in the tree is maximal (i.e., depth of 2 as opposed to node b whose 0-subtree contains H and whose depth is 1). The complete pre-order traversal of tree 1430 depicted in FIG. 2b is the sequence a b d H I e j n r V W c f L m p T u x Z A' Q.

Successor nodes to each leaf node H, I, V, W, L, T, Z, A' except the last leaf node Q in the pre-order traversal of a 0-complete tree are also of special importance. These nodes, termed bounding nodes, are respectively I, e, W, c, m, u, A', Q in FIG. 2b. Since bounding nodes are defined in terms of the pre-order traversal, each leaf node, except the last one Q, has its own unique bounding node. In addition, from the previously stated definition of the pre-order traversal, every bounding node is a 1-node.

2.a) Key Intervals

"Discriminators" of a node and a bounding node can be used to establish a key interval that corresponds to each leaf in the 0-complete tree. The "discriminator" of a leaf node is a binary string of the same length as the search keys and whose high order, or left-most, bits are the binary bits of the concatenated arcs, or path, leading up to the leaf with all of the other right-most bits set to 0.

The "key interval" is formally defined to be the key range between the leaf discriminator (inclusively) and the discriminator of its bounding node (non-inclusively). The exception is again the last leaf (Q by way of example) in the pre-order traversal, whose upper bound of its key interval is always known in advance and consists of all one bits (i.e., 11111111).

In Table 1, the key intervals of each leaf node H, I, V, W, L, T, Z, A', Q of the 0-complete tree 1430 are listed in lexicographic order. Thus, for example, leaf V has a discriminator of 01000000 and its corresponding bounding node W has a discriminator 01000100; the key interval of leaf V, as shown in Table 1, is 01000000 (inclusive) to 01000100 (non-inclusive), or 01000000 to 01000011 inclusively.

By examining Table 1, knowledge of bounding node discriminators is sufficient to identify the appropriate key interval of any leaf and hence the corresponding data record with any given search key. By way of example using search key 01000010, a search procedure that examines the bounding discriminators of the tree in their pre-order traversal sequence will find the correct key interval for the search key when the first bounding discriminator greater than the search key 01000010 is found. The discriminator of the first bounding node I, 00100000, is less than the search key 01000010. The second bounding discriminator of bounding node e in pre-order, 01000000, is also less than the search key. The discriminator of the third bounding node W, 01000100, is greater and is the non-inclusive upper bound of the key interval for leaf V. The inclusive lower bound of the key interval for leaf V is the discriminator of the previous bounding node e.

Along with each key interval in Table 1, there is shown a number denoting the "depth" of the bounding node in the 0-complete tree 1430 for that key interval. For example, the bounding node of leaf V is the leaf W that has a depth of 6 in the 0-complete binary tree. For the last node Q, which has no bounding node by definition, the upper bound of its interval is set to 11111111 with an assigned depth of 0.

There is one apparent regularity in the relationship between discriminators of a set of bounding nodes and their depths. If the depth of a bounding node is dd, then by definition of a discriminator, the $dd^{th}$ bit of the corresponding discriminator is set to 1 with all subsequent lower order bits 0.

In Table 1 wherein the key length is eight bits, the initial dummy discriminator is 00000000 and the depth of the first bounding node I is three, the third bit of the first bounding node discriminator is 1 and all subsequent, low order bits are 0 to obtain the first bounding node discriminator 00100000; the depth of the second bounding node e is two, using the first bounding node discriminator, the second bit is set to 1 and all subsequent bits are set to 0 in order to obtain the second bounding node discriminator 01000000. The discriminators of the remainder of the bounding nodes are constructed in a similar manner.

3) Prior Art $C_0$-Trees

Figure 3A:
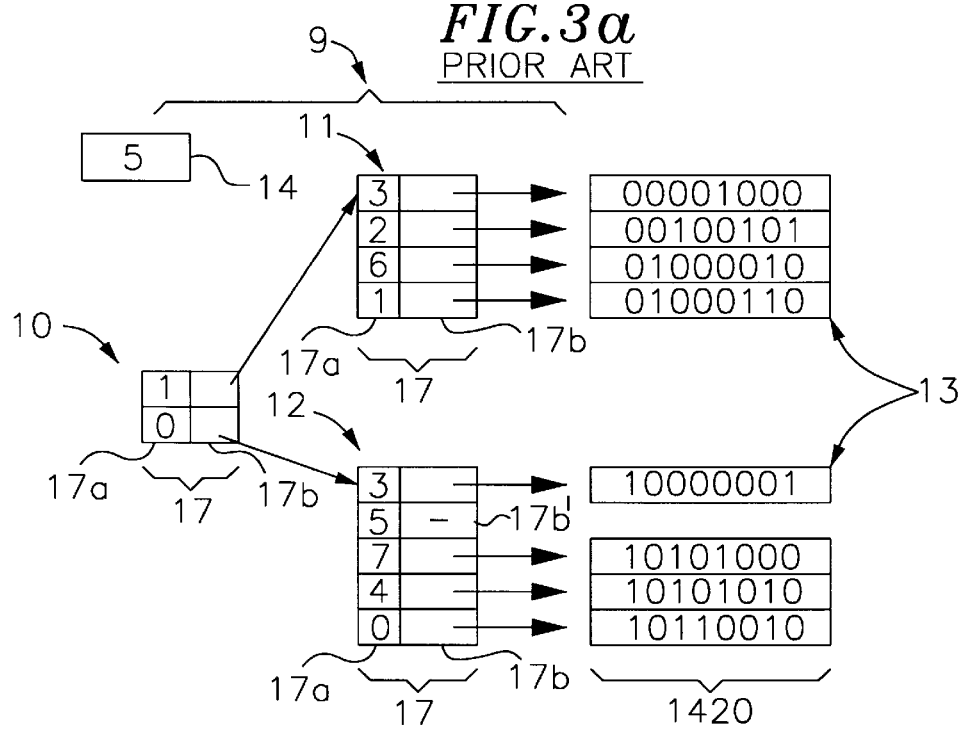
FIG. 3a is a diagram of a prior art $C_0$-tree index structure for values stored in a database.

Using the knowledge that key intervals can be constructed from depths of bounding nodes in a 0-complete binary tree, a prior art compact form of the 0-complete tree of FIG. 2b is represented at 9 in FIG. 3a. This compact form is called a $C_0$-tree. The tree structure has index blocks 10, 11, and 12 with entries 17. When forming a $C_0$-tree, the maximum number of entries 17 in any one index block is always less than or equal to a predetermined full index block number 14. Assuming a predetermined full index block number 14 of five in FIG. 3a, consider now how the tree structure 9 represents the 0-complete binary tree of FIG. 2b. Each entry 17 of index blocks 11 and 12 has a depth value 17a and a pointer 17b to a storage location 13. The only exception would be a NIL entry, such as 17b', representing an empty leaf or node of FIG. 2b, such as leaf T. This entry 17b' has an empty pointer 17b with no corresponding data stored in memory and wastes storage space within the computer system.

By way of example in FIG. 3a with reference to Table 1, the depth values 3, 2, 6, 1, of bounding nodes I, e, W, c corresponding to leaves H, I, V, W are stored in index block 11. The depth values 3, 5, 7, 4 of bounding nodes m, u, A', Q corresponding to leaves L, T, Z, A' and the assigned depth value of 0 for the final leaf node Q are stored in index block 12. The pointer 17b of each entry 17 points to a storage location 13 corresponding to a search key and its associated data record in memory or the storage device, except empty pointer 17b of entry 17b' corresponding to empty leaf T of FIG. 2b. Root index block 10 has entries 17 with pointers 17b that point to a corresponding leaf index block 11 and 12. The depth value 17a of each entry 17 of index block 10 corresponds to the last or minimum depth value, 1 and 0, of each respective leaf index block 11 and 12 and provides the key interval range for each leaf index block 11 and 12.

Figure 3B:
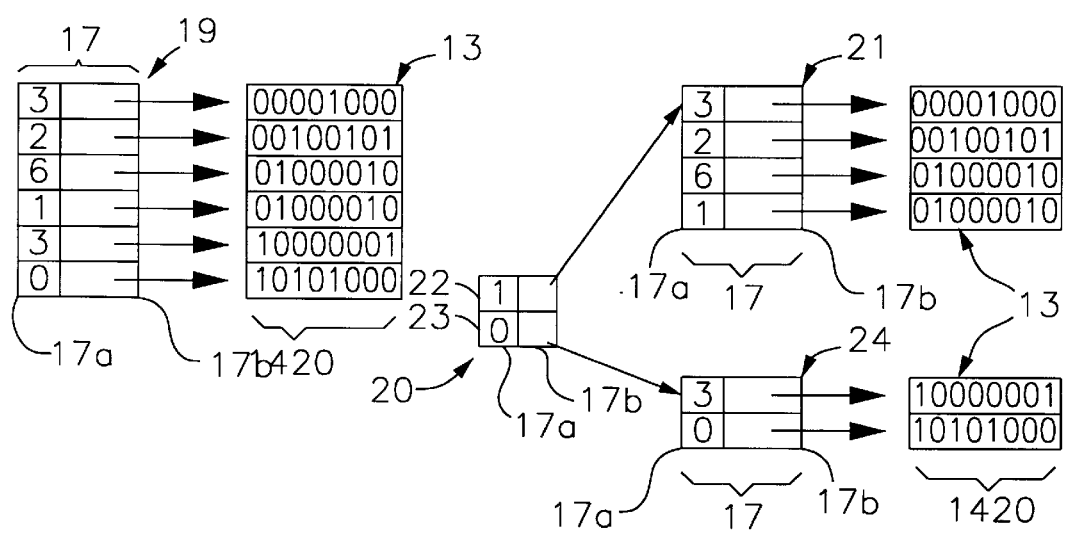
FIG. 3b is a diagram of the $C_0$-tree of FIG. 3a before splitting occurs.

Now consider the known method of splitting a full index block of a compact 0-complete tree as show in FIG. 3b, wherein the first six search keys have been indexed in the lexicographic order. At this point, the tree structure is a single index block 19 having six entries 17 which is a compact representation of a conceptual 0-complete binary tree having six leaf nodes indexing search keys 00001000, 00100101, 01000010, 01000110, 10000001, and 10101000. Once the sixth search key 10101000 in order is indexed, the predetermined full index block number 14 of five was exceeded, and a split of index block 19 must occur. The split occurs at the minimum depth of depth values 17a of index block 19, which is 1. This split creates a root index block 20, a leaf index block 21 having depth values 17a of 3,2,6 and 1 and a leaf index block 24 having depth values 17a of 3 and 0. After splitting, parent index block 20 is comprised of two entries 17. The first entry 22 has a depth value 17a of 1 corresponding to the bounding node depth of a leaf node indexing search key 01000010 in a conceptual binary 0-complete tree after input of the same six search keys, and the second entry 23 has a depth value 17a of 0 which is always the assigned value of the final leaf node in the pre-order of a 0-complete binary tree. The pointers 17b of entries 22 and 23 point to index blocks 21 and 24 respectively.

B) Compact 0-Complete Data Storage Structure of the Present Invention

Figure 4A:
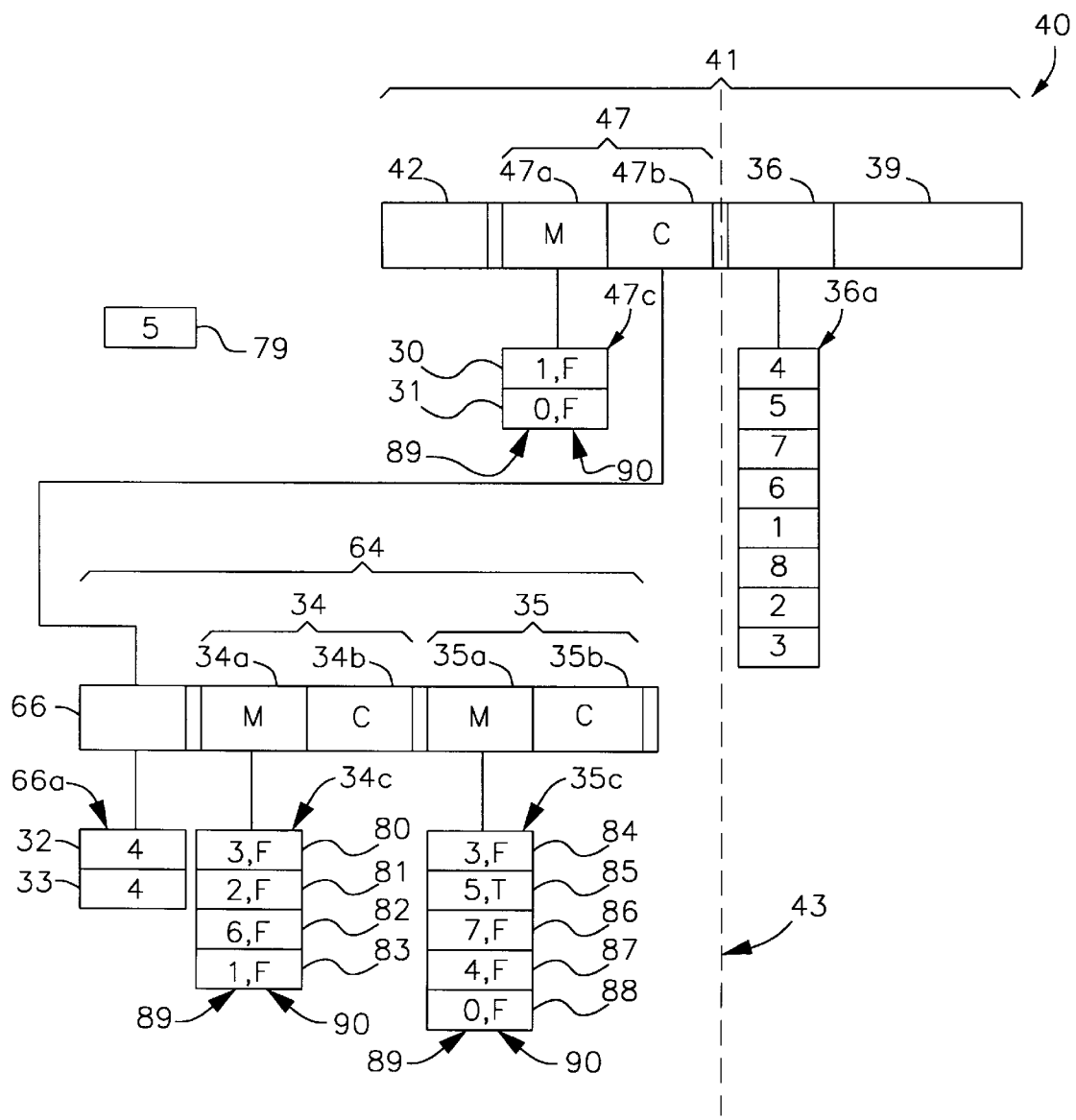
FIG. 4a illustrates an instantiation of a $C_0$-tree of the present invention.

Now, referencing FIG. 4a, a representation of the data storage structure 40 of an embodiment of the present invention is depicted after the input of the same set of search keys 1420 as in FIGS. 2a, 2b, 3a. A greater number of search keys can be input into the data storage structure 40, and it would be within the skill of the practitioner in the art to apply the described embodiment to a greater set of keys. As opposed to the $C_0$-tree of FIG. 3a having blocks 10, 11 and 12 with adjacent depth value 17a and pointer 17b entries 17, the data storage structure of FIG. 4 has tree structure 43 comprised of root node 47 with index block header 47a indexed to index block entries 47c and subtree pointer 47b, node 34 with index block header 34a linked to index block entries 34c and subtree pointer 34b, and node 35 with index block header 35a linked to index block entries 35c and subtree pointer 35b.

Each entry in 47c, 34c and 35c contains a depth value 89 and a data present indicator 90. In addition, the structure 40 has a separate pointers structure comprised of a pointers header 36 with corresponding entries 36a containing the pointers or referencable indices for the corresponding depth values 89 of leaf index block entries 34c and 35c that are non-NIL. The depth values 89 in 34c and 35c and the indices of pointer entries 36a are representative of the depth values 17a and pointers 17b in index blocks 11 and 12 of FIG. 3a, except that empty pointers corresponding to 0-leaf entries such as leaf T are excluded thus reducing wasted storage space. The index block entries 47c of node 47 includes entries 30 and 31 corresponding to the entries in index block 10 of FIG. 3a which give the last, i.e., minimum value depth entries in the corresponding index blocks of 34c and 35c, respectively. Pointer 47b of the root level 41 points to the leaf level 64 for key intervals corresponding to each of the index block entries 47c.

In addition to separation of the corresponding depth values 89 into index block entries 47c, 34c and 35c and pointer entries 36a, counts header 66 with corresponding entries 66a is related. Entries 66a contains count entries 32 and 33 that give the total number of F or full leaf (non-NIL) entries in index block entries 34c and 35c, respectively. Thus, count entry 32 has a value of 4 indicating there are 4 non-NIL 4 entries (or F values) in index block entries 34c. Count entry 33 has a value of 4 indicating there are 4 non-NIL entries (or F values) in index block entries 35c. Thus, the data storage structure 40 has a novel $C_0$-tree structure 43, a distinct pointers structure 36 and 36a, and a storage container 39. The nodes 34, 35 and 47 and the counts header 66 and counts entries 66a are in the tree structure 43 whereas the referencable indices or pointers are in the separate pointers structure comprised of header 36 and entries 36a.

The tree structure 43 in the FIG. 4 example has a height of two, root level 41 and leaf level 64. Index block entries 47c at root level 41 include two entries 30 and 31 and index block entries structures 34c and 35c at leaf level 64 include four entries 80, 81, 82, 83 and five entries 84, 85, 86, 87, 88, respectively. The height or number of levels of a $C_0$-tree storage structure varies depending on the number of data items and associated search keys to be indexed within the leaf entries of the tree structure 43 and on a predetermined full index block number 79 set within the file system. The described FIG. 4 example embodiment has a predetermined full index block number 79 of five.

Depth values 89 are located in index block entries 47c, 34c, 35c that are linked by index block headers 47a, 34a and 35a within the nodes 47, 34 and 35, respectively, of tree structure 43. Pointer entries 36a are linked to tree structure 43 by pointers header 36. Significantly, the data present indicator bit 90 is also in each of the index block entries 47c, 34c and 35c.

Each indicator bit 90 is in one of two conditions, F or T, represented by 0 and 1, respectively. In depth values 89 at the leaf level 64, a T or first condition, indicates that the corresponding entry is a NIL entry of the $C_0$-tree of FIG. 3a or empty node of a conceptual 0-complete binary tree such as leaf T at depth value 5 in FIGS. 2a and 2b. An F, or second condition, indicates the corresponding entry is associated with a corresponding data item in the storage device of the computer, such as entries 80 to 84 and 86 to 88 corresponding to leaves H, I, V, W, L, Z, A' and Q of FIGS. 2a and 2b. Each of the non-NIL entries 80 to 84 and 86 to 88 has a corresponding data item within the storage container 39 of memory 8 of the computer which is addressed by means of one of the pointer entries 36a. A NIL or T entry such as 85 does not address any index entry in 36a or data item in the storage container 39. Each of the pointer entries 36a is a pointer or a referencable index to the corresponding lexically ordered data item, or alternatively to one of the search keys 1420 which is associated with the data item, stored within the storage device of the computer.

Figure 6A:
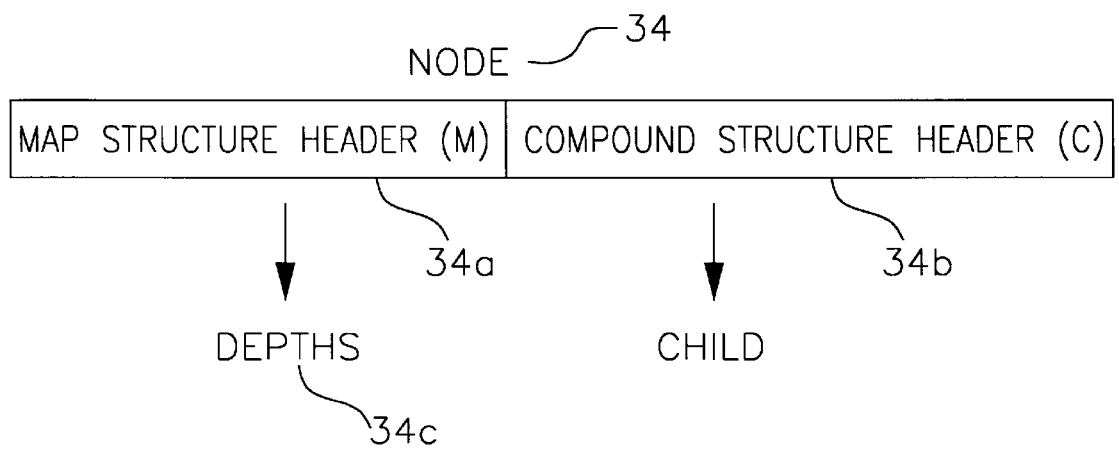
FIG. 6a is the diagram of an exemplary node of the storage structure.

Consider the data storage structure of the compact 0-complete tree 40 with reference to its component data structures. FIG. 6a is an exemplary diagram of the structure of each node within a computer system. Node 34 is shown by way of example, the others being identical. Node 34 is composed of two structures. Each structure is comprised of a header to a list of entries 34c, but each structure may be an array or some other form of data structure. One structure has a map header 34a that points to a list of entries 34c, and the other is a compound subtree pointer 34b that points a list of elements which may be comprised of other lists.

Compound header C associated with each index block points to the next lower level, if any, of the tree structure 43. Thus, in FIG. 4 compound header 47b points to a subtree of child nodes 34 and 35 in a branch. Each branch may or may not contain a compound header that points to a lower level of the tree. When the compound header C is not empty, as in node 47 the node 47 is an INTERIOR or ROOT branch type node. At a leaf level of the tree structure, no child nodes or subtrees depend from the nodes and the respective compound headers are empty as depicted at nodes 34 and 35 where compound pointers 34b and 35b, respectively, do not point to another level of the tree. Compound headers give a subtree its structure by grouping together several pieces of related information. In an initial INIT type structure 40' as in FIG. 6b, before any non-NIL values have been added, the map header 47a' of node 47' points to an entry with a depth value 89' of 0 and an indicator bit 90' set to the first or NIL condition T, which indicates there is no corresponding data item for this entry in the storage container 39'.

The first element, for example 42 in FIG. 4, of the compound structure is always empty at the root level, and is merely reserved so that the compound structure layout of the root level is similar to the various sub-levels of the tree and in the event a new root level needs to be created when the root index block 47a of node 47 becomes overfull, as when the number of entries 47c linked to root index block header 47a exceeds the predetermined full index block number 79 of five. The first element's 42 purpose in the deeper levels, other than the root level of the tree, is to be explained.

The fourth element at the root level 41 is the pointers header 36 pointing to a list of pointer entries 36a. The fifth element depicted in FIG. 4 is a storage container 39 in memory 8 or storage device 4 of the computer in which the actual data items of information are stored. Data items may be any form of data which can be stored by a computer system. Each of entries 36a corresponds to one of the index block entries 34c and 35c. Each entry in entries 36a contains a referencable index or a pointer to a data item in container 39.

The final two elements 36 and 39 are separate from the tree structure 43 and may be implemented in various distinct methods. For example, in contradistinction to the described embodiment in FIG. 4, the two elements may be placed in a distinct compound pointer structure, which is not physically adjacent to the tree structure 43.

The search keys 1420 and the data storage structure 40 are organized so the file system can simply and efficiently find requested items. As shown in FIG. 4b, storage container 39 contains data items, which are represented by search keys, in any order. A lexically ordered referencable index or pointer for each search key is placed in pointer entries 36a. Finally, each index or pointer addresses the location of a data item in container 39. A number of items to be inserted simultaneously are first sorted lexically within a buffer, then stored in any order into container 39. Storage of data values may be done by various methods known to one of ordinary skill in the art.

Returning to tree structure 43, in order to take advantage of the indicators 90, the first element 66 of the compound structure at any level, such as level 64, except the root level 41, is a counts header to counts entries 66a. Each of the counts entries 66a, such as entries 32 or 33, is a count of non-NIL leaf entries having an indicator 90 set to F in the corresponding index block entries 34c and 35c within the subtree level 64 connected to node 47 through compound header 47b. Since there are two nodes 34 and 35 at level 64 in FIG. 4, the counts structure contains exactly two entries 32 and 33. The first entry 32 corresponds to the count of index block entries 34c, and the second entry 33 corresponds to the count of index block entries 35c. Since the first index block entries 34c include four non-NIL or F entries 80, 81, 82, 83, the first entry 32 of the counter structure contains a count value of 4. Since the second index block entries 35c include four non-NIL entries 84, 86, 87, 88, the second entry 33 has a count value of 4. The non-NIL leaf entry count, such as entries 32 and 33, of each subtree of each level is incremented as each new non-NIL entry corresponding to a new data item is inserted into the corresponding index blocks and is decremented for each non-NIL entry deleted from the corresponding index block. While performing operations on the data storage structure 40 and descending the tree structure 43 from the root level 41 down, access information to the pointer entries 36a in the form of a pointers index, ps, is kept of the non-NIL or F leaf entries in preceding subtrees through the accumulation of the values in the first element of each subtree level, such as counts header 66 and entries 66a of level 64. In order to derive the corresponding pointers index of a stored data item, the preceding count from previous subtree levels is added to the count of non-NIL entries processed in the current leaf index block up to the entry corresponding to the key interval of the present search key. This index ps corresponds to the data item's pointer position in the pointers entries 36a, which is also the data item's lexical position.

Now, with reference to FIG. 4a and 4b, an example of how to determine the key interval range and data item of a search key is described. Further detail as to the steps to be performed in such a determination is described herein with reference to the program structure, particularly the Search Depths Procedure of FIG. 12. Assume a search is performed on the search key in binary form 10101000. The search key is represented by a sequence containing the ordinal value bit positions of the one bits in the search key, which starting from the left are values 1, 3, and 5. In addition, a final value is added after the last in the sequence and is a value representing the maximal key length in bits plus 1, which in this example is 9 since the key is one byte maximum. As a result, the sequence for search key 10101000 is 1, 3, 5 and 9. This search key sequence is compared to the depth values of the index blocks in the tree structure 43. First, the depth values 89 of index block entries 47c of root node 47 are compared to the elements of the search key sequence. A comparison of depth values 89 is iterated until an entry is found wherein the depth value is less than an ordinal value of the search key element of the sequence. In addition, an index to an entry in the current index block 47c and an index to the ordinal positions of the search key sequence element are maintained. The depth value of entry 30 is compared to the first ordinal element of the search key sequence. Since both are equal to 1, the index to the search key sequence element is incremented. Moreover, since the depth value is not less than the ordinal value, the index to the entries in the index block is incremented.

The depth value of the second entry 31 of index block 47c, 0, is compared to the second ordinal element of the sequence, 3. Since the two values are not equal and the depth value of entry 31 is less than ordinal value 3, i.e., (0<3), the search ends in this index block and, since this is a non-leaf node 47, the child index block corresponding to entry 31 is obtained and searched. In FIG. 4, this is index block structure 35a and 35c. In addition, a pointers index to the pointers entries 36a is incremented by the value stored in entry 32 of counts entries 66a. This pointers index contains the sum of preceding non-NIL entries (illustrated by the F entries) in index block entries 34c.

A count of non-NIL entries in the current leaf index block, initialized to one at the start of the search at any subtree level, of entries of 35c is maintained. Since the first entry 84 is non-NIL, the count of non-NIL entries is incremented by 1. The depth value of entry 84, which is 3, is compared to the second ordinal search value 3 of the search key sequence since the file system resumes search of the ordinal values of the sequence at the same location at which the search terminated in 47c of parent node 47. The depth value of entry 84, and the ordinal search key sequence element 3 are equal. Thus, the next entry 85 in 35c is accessed. In addition, since the ordinal value 3 equals the present bit position of the search key, the next ordinal value 5 of the search key sequence is obtained. Entry 85 is a NIL entry, so the count of non-NIL entries is not incremented. The depth value of entry 85 is then compared to the third ordinal value 5 of the search key sequence. Since the two are equal (5=5), the next entry 86 of index block entries 35c is obtained and the next element of the ordinal value sequence, 9, is obtained. Entry 86 is non-NIL, incrementing the count of non-NIL entries to two. In addition, the depth value 89 of entry 86 is compared to the ordinal value 9. Since the depth value 7 is less than the ordinal value 9 in the search key array (7<9), the search ends in this index block and, since this is a leaf node, the correct entry corresponding to leaf Z in FIG. 2*b* and Table 1 has been found.

At this point, the pointers index ps, which is equal to 4, is summed with 2 to result in 6. The 6 is used to select the sixth entry of pointers entries 36*a* which is an 8. This sixth entry is a referencable index to the eighth data item in storage ucontainer 39, which corresponds to search key 10101000 in binary form as shown in FIG. 4*b*.

Thus, the storage structure 40 avoids the need for storage of extraneous NIL (dummy) entries of the prior art of FIGS. 3*a* and 3*b* replacing them with the T/F indicators and the count structure. The tree structure 43 and the search keys 1420, along with the entries 66*a* keeping count of the number of indicator bits at the leaf level set to F, are used to keep an index to the pointers entries 36*a*. The pointers entries 36*a* then comprises an index to the items stored in the storage container 39.

Moreover, since the pointers header 36 and pointer entries 36*a* are distinct from the remainder of the tree structure 43 and store referencable indices to the keys 1420 in lexicographic order, a search key or data item can be accessed in its lexical order without using the tree structure 43 at all. By knowing the lexical position of the data item to be located, the data item can be located by accessing the entries 36*a* alone.

Figure 6B:
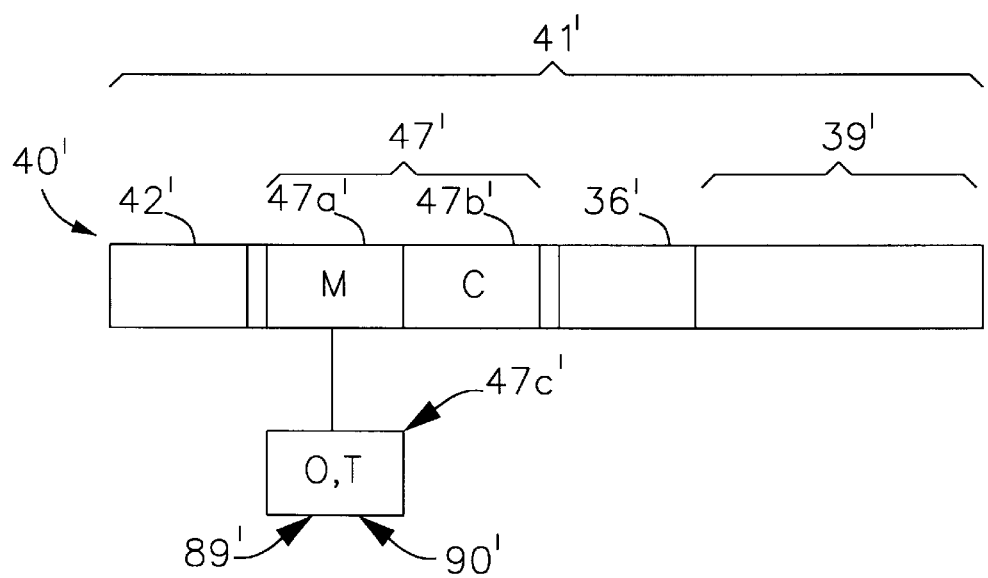
FIG. 6b is the diagram of an exemplary INIT node.

To build the $C_0$-tree of the present invention, an INIT type structure is created as shown in FIG. 6*b*. Individual search keys are then inserted in the method of the program structure described below. When an index block is full, the block is split into two parts in the manner described below. Thus, building the $C_0$-tree data storage structure of the preferred embodiment is a matter of iterative processing of the storing of indexing information and node and index block splitting methods used for entering new data items or keys in lexicographic order into an established $C_0$-tree of the preferred embodiment.

C) Program Structure of Storage and Retrieval of Keys in the Compact 0-Complete Tree Representation The methods of sequentially processing a number of search keys within the tree structure to perform a predefined function on each search key, a method for locating a search key within the tree structure, a method for storing and indexing information for each search key within the tree structure, and splitting an index block of the present invention will now be described.

The method for sequentially processing a number of search keys comprises searching through the data storage structure for the index block corresponding to each search key, performing a predefined function such as a search or inserting search keys to be indexed by the tree structure, splitting index blocks when the number of entries in each block surpasses a predetermined full number or becomes greater than a large maximum number, and processing an empty string within the search keys to be inserted within the tree structure.

The computer program structure of the $C_0$-tree structure is illustrated diagrammatically in the flow diagrams of FIGS. 7–19. A summary of the macro definitions used throughout the program structure is presented in Table 3 wherein is indicated the macro name and a brief description. Similarly, a summary of the flow diagrams of FIGS. 7–19 is presented in Table 2 wherein is indicated the flow diagram reference and its inputs, variables and outputs. Each of the procedures will now be described with reference to Table 2 and Table 3. For convenience, blocks to perform the steps to be described with reference to FIGS. 7–19 are in parenthesis.

1) Sequential Processing Procedure

Figure 7:
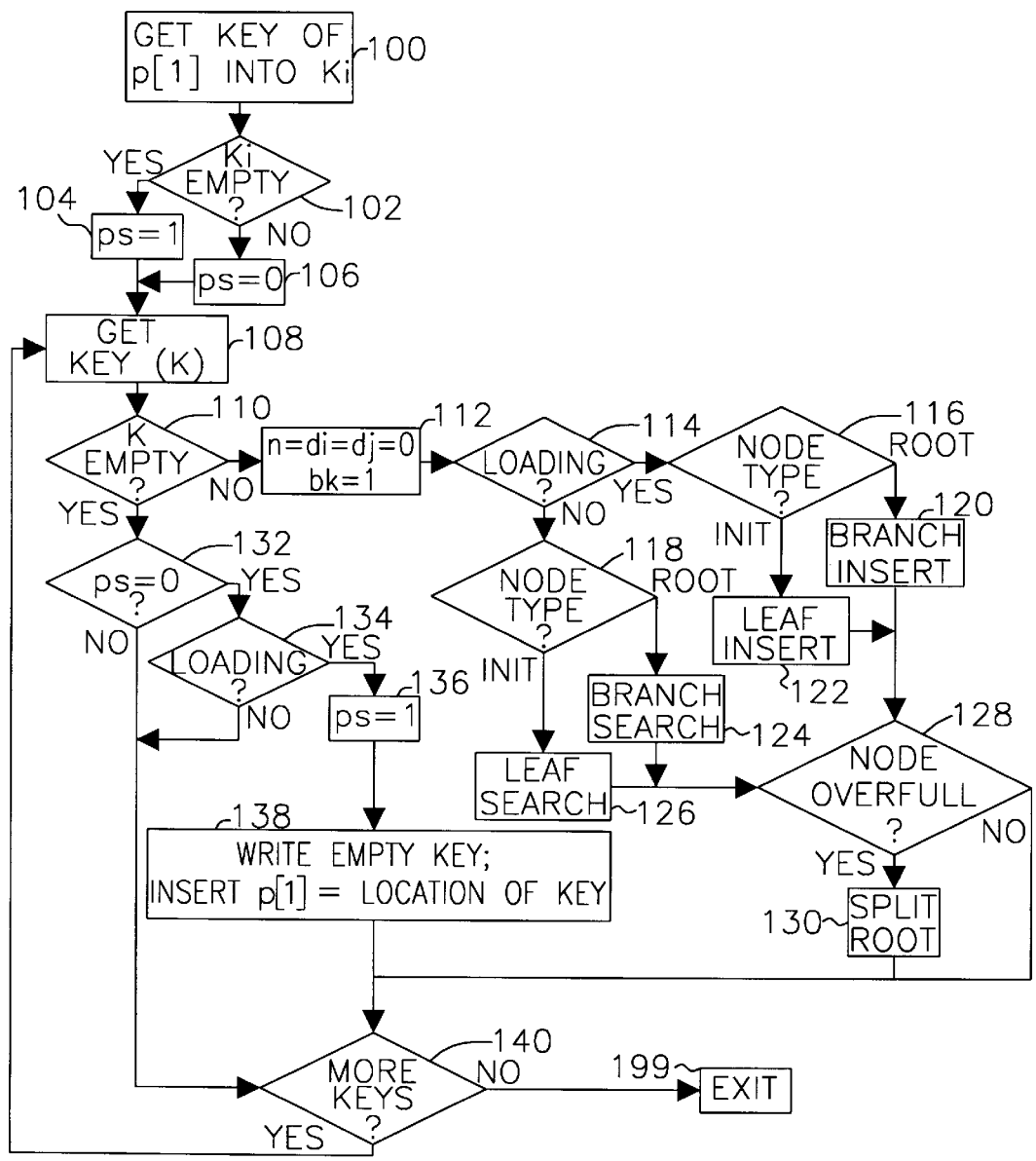
FIG. 7 is a flow chart of the Sequential Processing Procedure of the present invention.

FIG. 7 illustrates a Sequential Processing Procedure wherein a predefined function is performed on a buffer within memory 8 (FIG. 1*b*) of lexically sorted search keys. The program initially fetches a number of search keys and lexically sorts them within the buffer. Then, the following described steps are performed.

The computer under the program control fetches from the storage container 39 the stored key associated with the first entry of the pointers entries 36*a* pointed to by pointers header 36 (100). The stored key is checked to see if it is empty (102). This step is part of empty string processing routine and checks to see whether the first entry of pointers entries 36*a* previously indexed an empty string data item.

If the stored key is empty, an initial index ps to the pointers entries 36*a* that is a sum of non-NIL entries in the tree structure is set equal to 1 to indicate that an empty string is present within pointers entries 36*a* (104). If the key is not empty, the initial index value ps is set equal to 0 (106).

A search key K is fetched from the buffer (108). The search key is then processed to see if it is empty (i.e., an empty string) in order to determine whether an empty string is to be added to storage container 39 and added to pointers entries 36*a* (110).

If the search key is not empty, initialization of the variables will occur. Trailing variable di, which stores the depth value of the previous entry when descending from an INTERIOR index block to a subtree branch, and a variable of the depth dj of the bounding node in the present index block are initialized to 0. The variable bK which references the current and terminating bit position of the present search key being processed by the database system is initialized to 1 (112).

The actual predefined function to be performed is determined by examining the flag LOADING (114). If LOADING is indicated, then the system sequentially processes an inserting function for storing the indexing information for each search key, and a node type check is done to see if the present node is a ROOT type or an INIT type structure (116). If the system is not loading, then a sequential search is performed in order to locate the key interval corresponding to the present search key, and a node type check is done to see whether the node is a ROOT type or INIT type (118).

If loading and the node is ROOT type, the Branch Insert Procedure (120) is performed. If the node is INIT type, Leaf Insert Procedure (122) is performed. If the step 118 indicates the node is a ROOT type, then a Branch Search Procedure is performed (124). If during step 126 the node at the top of the tree 43 is an INIT type, then Leaf Search Procedure is performed (126).

After performing any of 120, 122, 124, 126 where the tree 43 may have been altered, NODE OVERFULL check is then done to see whether the number of entries in the current index block is larger than the predetermined full index block number 79 (FIG. 4) allowed (128). If the number of current entries is larger than the full index block number, then the Split Root Procedure to be described (130) is performed. If it is not, the program steps to block 140 described herein.

Returning to step 110, if key K is empty and the stored key Ki referenced by entry p[1] is empty, then further empty string processing transpires and a check is done to see if the index to the pointers entries 36*a*, ps, is equal to one as established above (132).

If ps is 0, then the system knows that the check performed in step 102 did not find an empty string stored in storage container 39. A check is performed to see whether LOADING is true and a loading request (134) is being performed on the file system. If true, loading of search keys into the tree structure is being performed and the index to the pointers entries 36a, ps, is set to 1 to indicate the addition of an item (i.e., the addition of the empty string) (136).

At this point, it has been determined that the search key is empty and that a loading request is being performed. Therefore, the key is an empty string. An element is inserted at the first entry linked to pointers header 36a and the first position of the pointers vector p[1] is set to the address of the key in the storage container 39 (138).

Finally, a determination of any more keys is made (140) to see if more search keys are to be analyzed from the buffer of memory 8. If so, the loop to step 108 is followed. If no more search keys are to be analyzed, the Sequential Processing Procedure is exited (199).

2) Leaf Search Procedure

Figure 8:
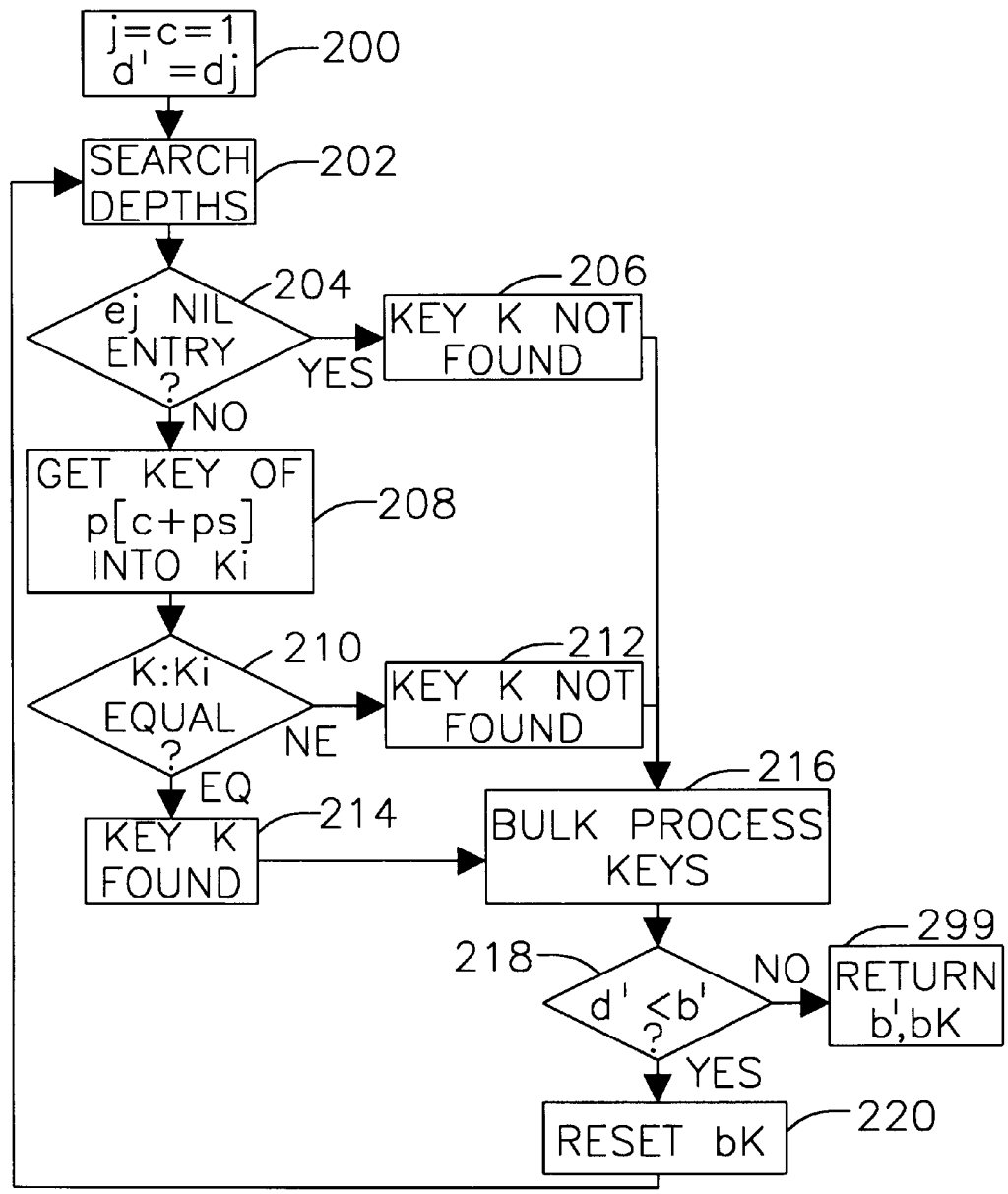
FIG. 8 is a flow chart of the Leaf Search Procedure of the present invention.

The Leaf Search Procedure, which is called by the Sequential Processing Procedure or the Branch Search Procedure, is illustrated in FIG. 8. This portion of the program structure finds an entry within the tree structure with a key interval which corresponds to the present search key and, thus, locates the search key within the tree structure if it has been previously indexed. The following described steps are performed.

The variables j and c are initialized to 1, and d' is set equal to dj, the depth of the bounding node (200). The Search Depths Procedure to be described locates the entry in the present index block having a key interval corresponding to the present search key (202). A determination is then made to see whether the indicator of the located entry ej is a NIL indicator (i.e., indicator 90 is T) (204).

If the entry ej is a NIL entry, then the present search key is not found within the tree structure (206). If the entry is non-NIL (i.e., indicator 90 is F), then the stored key corresponding to entry ej is fetched into Ki from the storage container 39 by using the entry p[c+ps] of the pointers entries 36a indexed by the summed count c+ps of non-NIL entries (208). The summed count provides the correct location or index in the pointers entries 36a since the sum of non-NIL entries in previous index blocks ps and the count c of non-NIL entries in the current index block fetched by the Search Depths Procedure is maintained. By adding the two values, the element of the pointers entries 36a associated with entry ej is found. Next, the fetched key Ki is compared to the search key K to see whether the search key is the same value as the key corresponding to leaf entry ej (210). If the two keys are not equal NE, the search key K was not found and does not exist within the tree structure (212).

If they are equal, the appropriate leaf entry and key K were found (214). The Bulk Process Procedure, to be described, is then performed in order to access the next search key and determine the distinction bit b' between the present search key and the next key within the buffer to process (216).

A determination is then made as to whether the next search key to be processed is included in the key interval range of the current index block (218), i.e., d'<b' where d' is established or assigned at the initialization of this procedure. If the next search key is within the key interval range of the current index block, the Reset bK Function is performed, where bK is the present key bit position at which the search for the next search key is to be resumed (220). By recalling the key bit position at which a search terminated at the end of each search or insert procedure, the preferred embodiment is able to determine the appropriate key bit at which to resume processing the search of the next search key since the plurality of keys are processed in the lexical order of the values. If the present key is not included in the key interval range of the current index block, there is a return to the routine which called the present iteration of the Leaf Search Procedure with the appropriate values of the distinction bit b' and key bit position bK retained (299).

3) Leaf Insert Procedure

Figure 9:
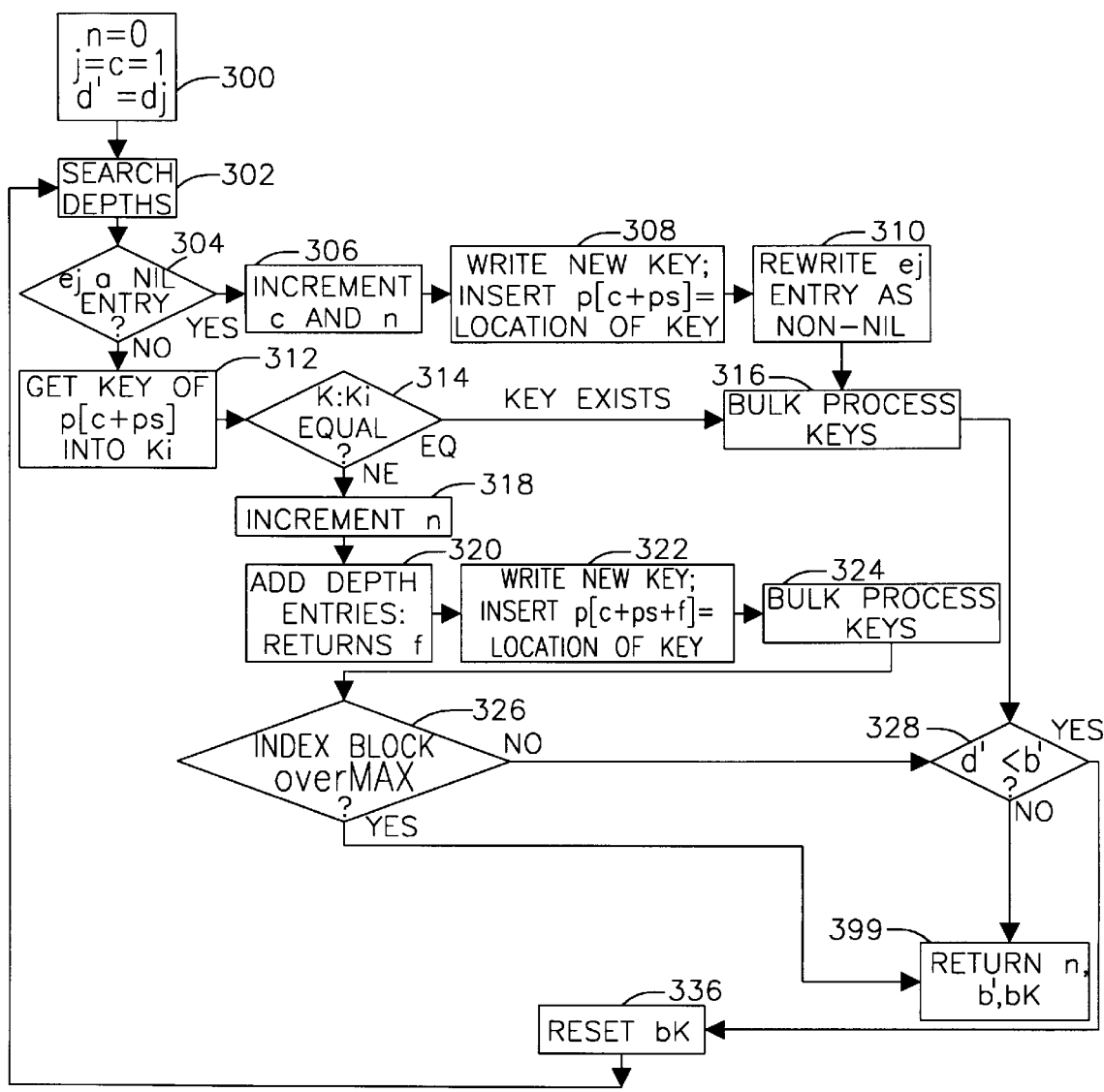
FIG. 9 is a flow chart of the Leaf Insert Procedure of the present invention.

If a loading request is being performed in step 114, then the new keys from the buffer of sorted keys which did not previously exist in the storage device 4 are added individually to the data storage structure. The Leaf Insert Procedure is illustrated in FIG. 9 and inserts each new search key by determining its correct placement and storing the index information of the key. The steps of the Leaf Insert Procedure are described below.

The variables of the procedure f=0, j=1 and d'=dj (the bounding depth) are initialized (300). The Search Depth Procedure is performed to locate the entry whose key interval includes the present search key (302). A check is then done to see whether the entry ej located by the Search Depth Procedure is a NIL entry, having a T indicator 90 (304).

If the entry is a NIL entry, then the point of insertion entry is found. The variables c and n are incremented in order to reflect the addition of the new entry to be inserted as a non-NIL entry and in order to reflect the newly inserted pointer to the key (306). An element is inserted in pointers entries 36a and is assigned the address of the key and its referenced data item (308) which are stored in the storage container 39. The indicator of the entry ej is changed from NIL (T) to non-NIL (F) to reflect the association of the entry with a storage element in the storage container 39 and of the pointers entries 36a (310).

If during step 304 the entry is not a NIL entry, a key addressed by the pointers entries 36a element p[c+ps] is fetched and loaded into Ki (312). The present key K is compared with the fetched key Ki to see if they are equal (i.e., in order to determine if the present key already exists in the storage container 39 (314). If they are equal, the Bulk Process Procedure is performed in order to determine if the next key to be processed is within the key interval of the current index block (316).

If the present key and the fetched key are not equal, the count n of new entries added to pointers entries 36a is incremented since the present key did not exist (318). The Add Depths Procedure to be described, is then performed in order to add any dummy entries and determine the correct placement of the new entry. The routine returns a flag f which denotes whether the present key being processed is greater than or equal to the fetched key Ki (320) and indicates the position or index in pointers entries 36a. An element is inserted into pointers entries 36a and is assigned the address of the key and its referenced data item in the correct indexed placement corresponding to the sum of the number ps of non-NIL entries in the preceding subtrees the number c of non-NIL entries of the present index block, and the value of the flag f (322).

The Bulk Process Routine is then performed returning b', the distinction bit (324). Then, a check is done to see whether the number of entries in the present index block is over MAX, greater than the maximum allowed. The maximum is set at a very high threshold much greater than the predetermined full index block number 79 for entries of an index block, e.g., five in FIG. 4 (326).

If the number of entries in the present index block is not larger than the maximum, a determination is made as to whether d' is less than b' indicating that the next key to be processed, fetched during the Bulk Process Routine, is within the key interval range of the present index block (328). If so, a Reset bK Procedure is performed (336) before returning to step 302. Regardless, the procedure eventually returns to the calling procedure with the value of the distinction bit b', the present key bit position bK, and the number of new elements in the pointers entries 36a (399).

4) Branch Search Procedure

Figure 10:
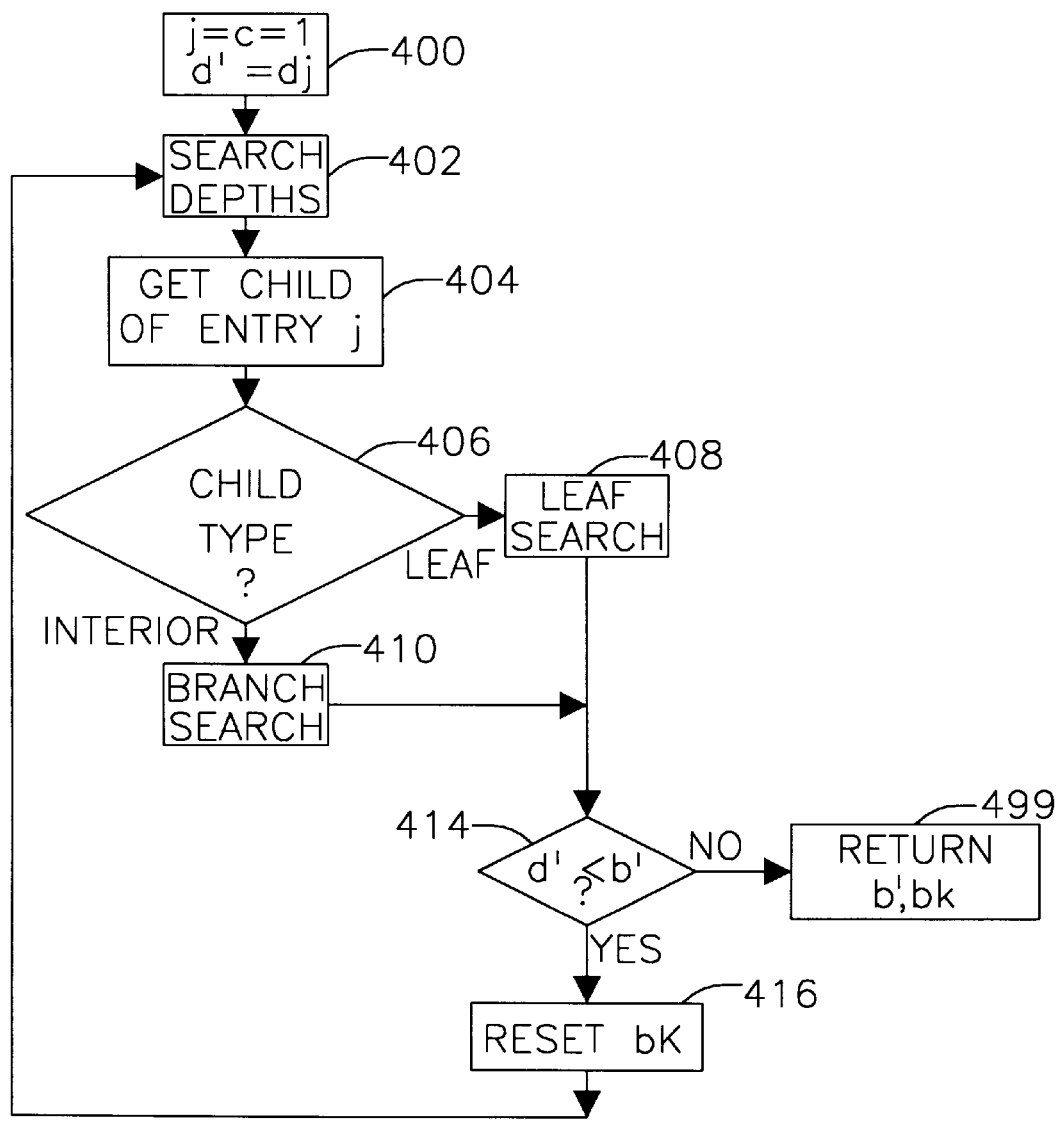
FIG. 10 is a flow chart of the Branch Search Procedure of the present invention.

If the Branch Search Procedure of FIG. 10 is called from the Sequential Processing Procedure of FIG. 7, then the following steps are performed in searching through branches of the $C_0$-tree data storage structure in order to locate the correct LEAF level and index block to perform the Leaf Search Procedure.

First, the variables j=c=1 and d'=dj, where dj is the bounding depth, are initialized (400). The Search Depths Procedure is performed to locate the appropriate entry in the present INTERIOR branch index block with a key interval containing the present key (402). Since the system is at a branch level, the entry is associated with a subtree of the tree structure.

The located child node corresponding to entry ej of the branch is fetched (404), and then checked to determine the node type (406). If the node type of the child block is a LEAF, the Leaf Search Procedure is performed (408). If the node type is a non-leaf, i.e., an INTERIOR type, the Branch Search Procedure is performed (410).

The procedure determines whether the present key is within the key interval range of the present index block, i.e., d'<b' (414). If so, the Reset bK Procedure to be described is performed (416) and a loop to step 402 is executed. If not, then the program returns the value of the distinction bit b' and the key bit position bK to the Sequential Processing Procedure and the present iteration of Branch Search is complete (499).

5) Branch Insert Procedure

Figure 11:
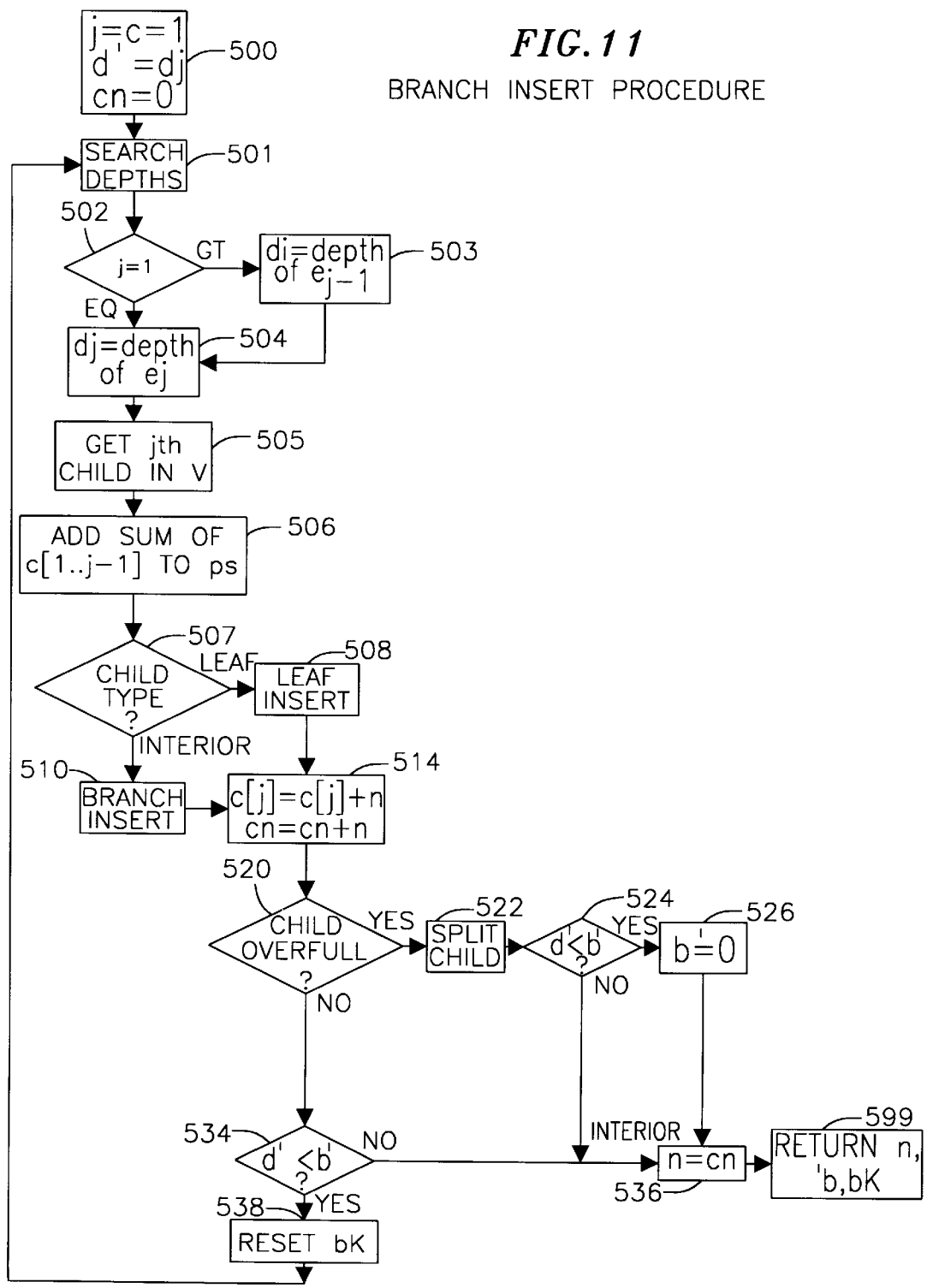
FIG. 11 is a flow chart of the Branch Insert Procedure of the present invention.

If the predefined function to be performed on the sorted search keys in the buffer is a load and the index block type of Step 116 of the Sequential Processing Procedure is determined to be a ROOT index block, then the Branch Insert Procedure is called in Step 120 and the steps, as shown in FIG. 11, are performed as follows until the leaf index block containing the key interval of the present search key is located.

The index to the entry whose interval contains the current search key is set to 1, i.e., j=c=1, the present bounding depth value is assigned, i.e., d'=dj, and the count of new keys associated with the parent index block is set to zero, i.e., cn=0 (500). Then, the Search Depth Procedure is performed to locate the entry having the present key in its key interval (501). This procedure returns the key bit position to resume search processing of the search key and the index to the entry within the current index block whose key interval contains the search key.

Since the computer is performing a Branch Insert Procedure, the index block type of the present index block is either INTERIOR or ROOT. After locating the entry with the present key in the entry's key interval, the trailing depth variable, di, is updated if the index j to the depths entry of the present index block is greater than 1 (502). The program realizes that the located entry is not the first entry of the present INTERIOR type index block, and the trailing variable di is updated to the depth value of the entry ej−1 previous to the located entry in the present index block (503). The variable dj is then set to the depth of the entry ej (504).

At this time, the indexed child node, jth child in the subtree V of the current index block, corresponding to the located entry is fetched including the index block depth entries and the subtree of the child index block (505). This step returns an updated sum of non-NIL entries ps with which to index the pointers entries 36a. More specifically, since the first element, the counts structure, of the compound structure of the present level of the tree contains the non-NIL entry count information for preceding subtrees, the elements of the counts entries up to the value of j are summed together and added to the prior sum of the count of non-NIL entries to arrive at the new sum (506).

A determination is then made of the type of the fetched child node from Step 504 (507). If the child node is a LEAF, then the Leaf Insert Procedure is performed (508). If the child node is an INTERIOR, then the Branch Insert Procedure is performed (510).

After processing is returned from Branch Insert or Leaf Insert, the counts entry c[j] corresponding to the present index block is set to its previous value plus the number n of new keys associated with entries of the child index block (514). The count cn of new keys associated with the parent index block is incremented by the count n of new keys associated with entries of the child index block (514).

The procedure then determines whether to split the present child node by determining whether the index block is overfull (520). If the index block entries have surpassed the predetermined full index block number of entries allowed per index block then the Split Child Procedure, to be described, is performed (522).

A check is done to see whether the present key is within the key interval range of the present index block (524), i.e., d'<b'. If so, the distinction bit b' is set to zero which terminates inserting up to the root level because a Split Child occurred (526). In either case, the number n of new keys associated with entries of the child index block is set as a return variable to the count of new keys cn for the current index block (536).

If the index block is not overfull, a check is done to see whether the present key is within the key interval range of the present index block, i.e., d'<b' (534). If the present key is within the key interval of the present index block, the Reset bK Procedure is performed (538). Regardless, the procedure returns to the Calling Procedure with the count of the new keys n added to the child index block, the distinction bit b', and the key bit position bK (599).

6) Search Depth Procedure

Figure 12:
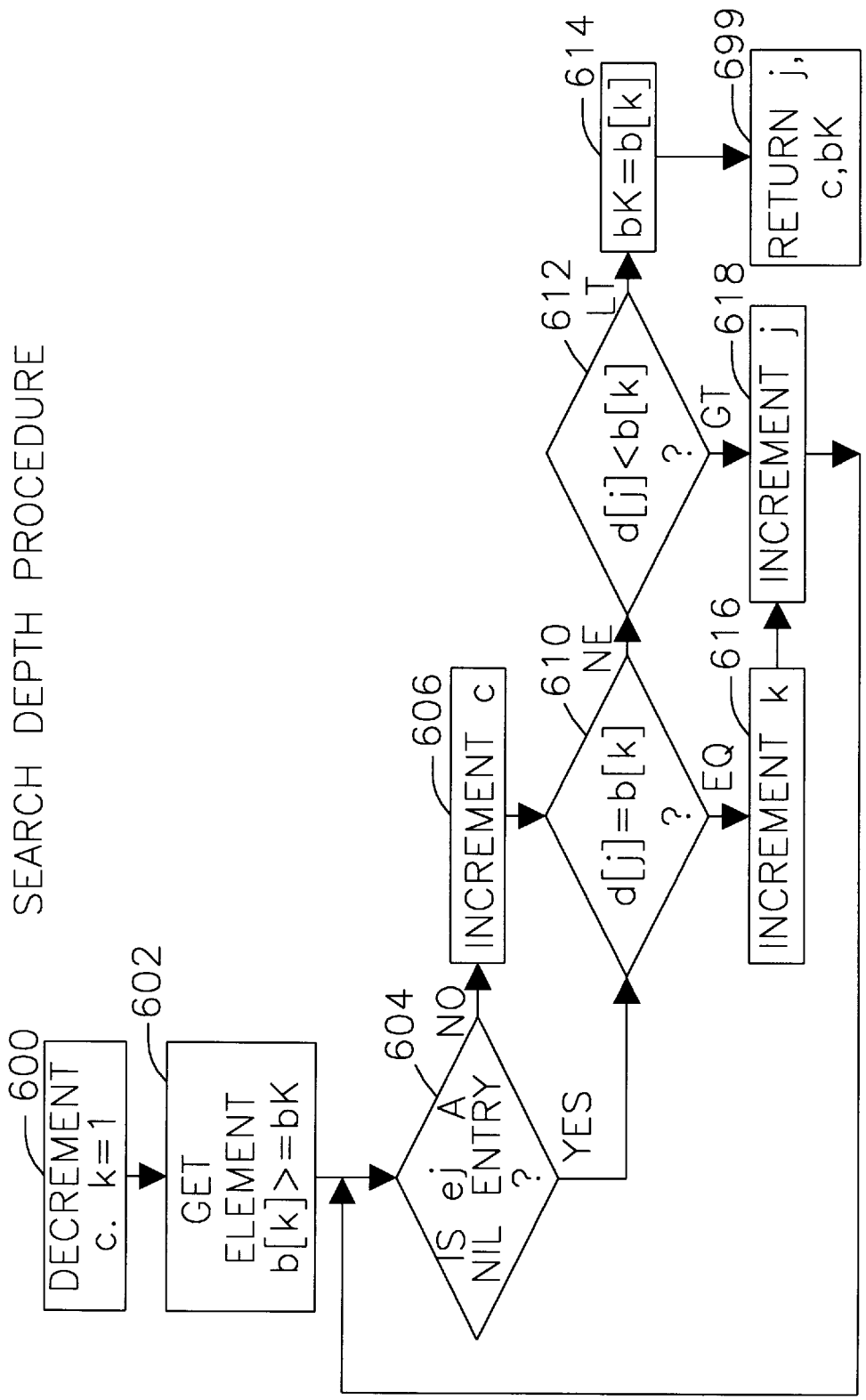
FIG. 12 is a flow chart of the Search Depth Procedure of the present invention.

As depicted in FIG. 12, every time a search or insert is performed on the $C_0$-tree data storage structure, the Search Depths Procedure is performed to locate the entry within the present index block wherein the key interval corresponds to the present key.

Index variable k is set to 1 and the input variable, count c of non-NIL entries, is decremented (600). The procedure gets the ordinal element b[k] of the present search key which is at least as large as the present key bit position bK to begin searching the present key (602). The ordinal elements are comprised of the values of the 1-bit positions in the two letter alphabet of zeros and ones in the current search key being analyzed. A determination is then made as to whether the present entry ej is a NIL entry (604). If the entry is not a NIL entry, the count c of non-NIL entries of the present index block is incremented (606).

The preferred embodiment then determines whether a depth value dj of entry ej of the present index block is equal to (610) and, if not equal, less than (612) the present ordinal element b[k]. If equal, then index variable k is incremented (616). If not equal and greater than, then the index variable j to the depth entries of the index block is incremented (618). If it is less than, then the present key bit position bK is set equal to the present ordinal value b[K] (614). Finally, the procedure returns to the calling routine (699). The values of the index variable j used to index the depth entry corresponding to the key interval of the present key K, the count c of non-NIL entries of the present index block which is used to access the pointers entries 36a, and the determination of the present key bit position bK which allows the file system to recall the present key bit position of the search keys being processed is returned.

6.a) Multilevel Search

Figure 5:
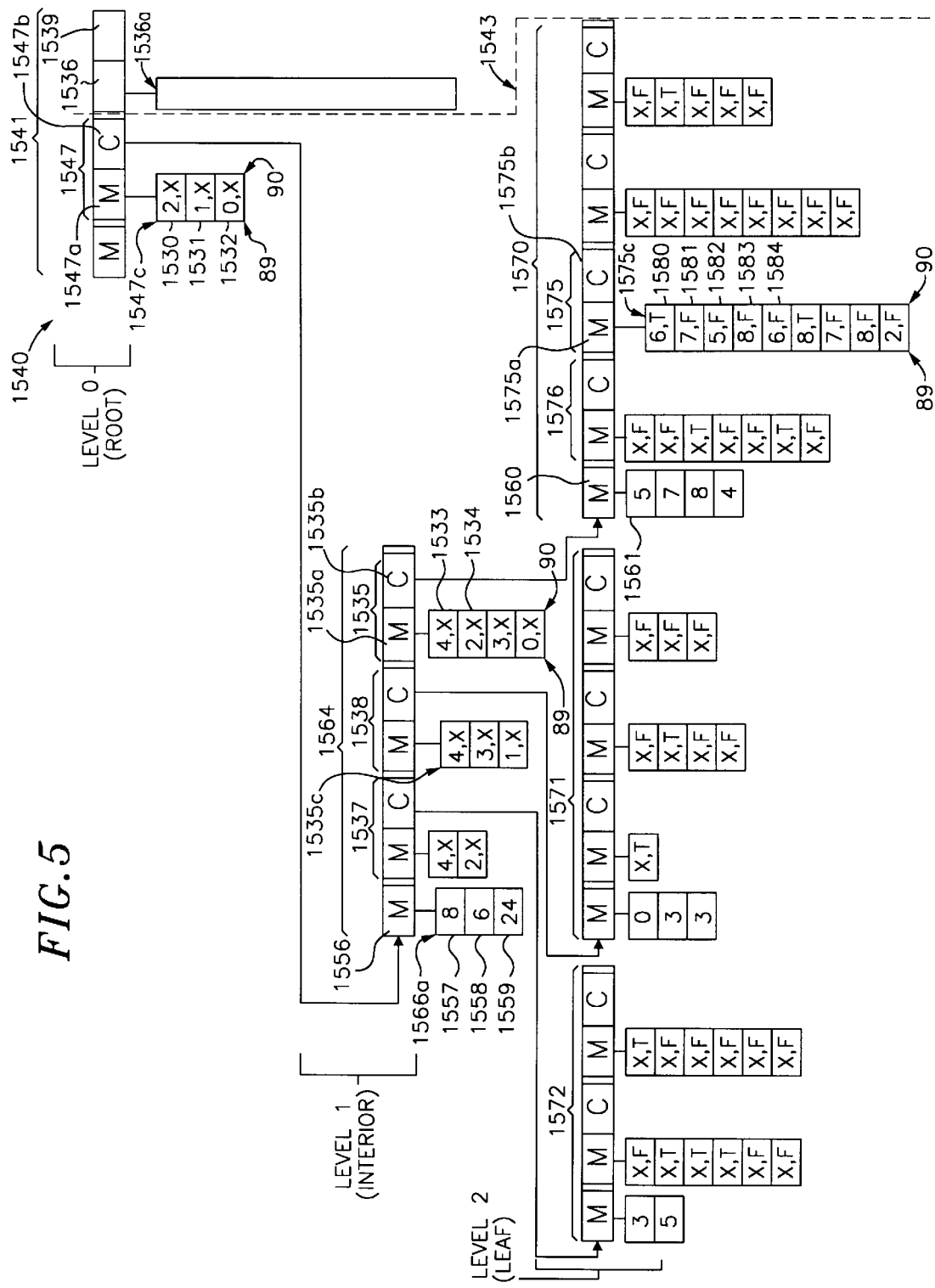
FIG. 5 illustrates an exemplary three level embodiment of a $C_0$-tree according to the present invention.

Now that the pertinent program structure to search for a search key has been described, a more detailed example of how to determine the key interval range and data item of a search key of a $C_0$-tree that is comprised of more than two levels is described with reference to FIG. 5 and Table 4. The data storage structure 1540 is comprised of three levels: ROOT level, INTERIOR level, and LEAF level. Certain items of information within structure 1540 that do not pertain to this example have not been depicted in FIG. 5 and have been replaced with the letter X. Thus, index block entries of ROOT level 1541 and INTERIOR level 1564 have an X depicting the present indicator bit since the indicator bit only indicates the presence of a corresponding data item at a LEAF level structures, such as 1570. Moreover, the depth values of each of the index block entries at the LEAF level, other than entries 1575c, are shown as an X since they are not utilized by the present search example. Finally, the contents of pointers entries 1536a and storage container 1539 have not been specifically described as they are not necessary to the present example.

Assume a search is performed on the search key 10011001 as shown in Table 4. The search key is represented by a sequence b[k] containing the ordinal value bit positions of the one bits in the search key, which starting from the left are 1, 4, 5 and 8. As in the previous example described, a final value, 9, is added after the last in the sequence. Therefore, the sequence is b[k]=<1, 4, 5, 8, 9>. First, the depth values 89 of index entries 1547c of root node 1547 are compared to the elements of the search key sequence. An index j to the index block entries 1547 is maintained, and an index k to the ordinal position of the search key sequence is maintained. At step 1 of Table 4, the depth value d[j] of entry 1530 is compared to the first ordinal element b[k] of the search key sequence, which is equal to 1. Since the depth value d[j] is greater than the ordinal element b[k], the index j to the index block entries 1547c is incremented.

At step 2 of Table 4, the depth value d[j] of the second entry 1531 of index block entries 1547c is compared to the first ordinal element b[k]. Since they are equal, the index k to the search key sequence is incremented. Then, the index j to the index block entries 1547c is incremented.

Since j=3 and k=2 at step 3, the depth value d[j] of the third entry 1532 is compared to the second ordinal element b[k]. Since the two values are not equal and the depth values d[j] of entry 1532 is less than ordinal value b[k] (i.e., 0<4), the search ends in this index block headed by 1547a. Since this is a non-leaf node 1547, the child node and index block corresponding to entry 1532 are obtained and searched. In FIG. 5, this is node 1535 with subtree 1570, index block header 1535a and entries 1535c. In addition, the terminating key bit position bK is set to the presently indexed ordinal value b[k] (i.e. bK=4) in order that the computer system may easily and efficiently resume the search procedure at the child index block.

In addition, as shown in step 4 of Table 4, a pointer index ps to the pointers structure 1536 is incremented by the values stored in entries 1557 and 1558 of counts header 1556 of INTERIOR level 1564 since these entries precede the third entry which is the subtree to be searched. This pointers index ps contains the sum of preceding non-NIL entries (illustrated by the F entries) in the previous siblings of this node 1535. Thus, entry 1557 corresponds to non-NIL leaf entries depending from the compound header C of node 1537 and entry 1558 corresponds to the non-NIL leaf entries depending from the compound header C of node 1538. The pointers index ps is therefore presently equal to fourteen, since eight non-NIL leaf entries depend from node 1537 and six non-NIL leaf entries depend from node 1538.

At step 5 of Table 4, the index variable j is initialized to one. The first depth value d[j] of entries 1535c is compared to the second ordinal search value b[k]. (The second ordinal value, which equals four, is used since the computer system at step 602 in FIG. 12 increments the index k and obtains the ordinal element in the search key sequence greater than or equal to the terminating key bit position, bK, which was set to four when search of the parent node 1547 ended.) Since d[j] equals b[k], the index k to the search key sequence is incremented. Then, the index j to the entries 1535c is incremented.

At step 6, the depth value d[j] of the second entry 1554 of index block entries 1535c is then compared to the third ordinal element b[K], which is equal to five. Since the depth value d[j] is less than the ordinal element b[K], (i.e., 2<5), the search ends in this index block headed by 1535a. Since node 1535 is an INTERIOR node, the child node and index block corresponding to entry 1535 is obtained. In FIG. 5, this is node 1575. The terminating key bit position bK is set to the presently indexed ordinal value b[k] (i.e., bK=5). Then the pointer index ps is updated at step 7 to additionally contain the number of non-NIL entries in previous siblings of node 1575. Since at a LEAF level each count entry, such as entry 1561 linked to count header 1560, corresponds to the number of non-NIL entries in a respective node in a LEAF structure 1570, the first counts entry 1561 corresponds to the number of non-NIL entries in the first node 1576 of structure 1570. The pointer index ps is therefore equal to nineteen, its previous value fourteen plus the value found in counts entry 1561, five.

The index variable j and k are again set to one. The computer system increments the index k and obtains the ordinal element b[k] greater than or equal to the terminating key bit position bK. Thus, it obtains the third element which is equal to 5.

A count index c of non-NIL entries, initialized to zero at the start of the search of entries 1575c, is maintained. Since the ordinal element b[k] is less than the depth value d[j] of entry 1580 of index block entries 1575c at step 8, the index j to the entries 1575c is incremented. An index c to the entries 1575c is not incremented since entry ej is a NIL entry. At step 9, the ordinal element is again less than the depth value d[j] of entry 1581. Thus, index j is incremented. The index c is incremented since entry ej is a non-NIL entry. The depth value d[j] of the non-NIL entry 1582 is equal to the present ordinal element b[k] in step 10. Therefore, index k is also incremented.

In step 11, the depth value d[j] of the fourth non-NIL entry 1583 is compared to the third ordinal element b[K]. Again, the values are equal (i.e., 8=8). Indices k, j and c are incremented. Finally, the depth value d[j] of the fifth entry 1584 is compared to the fourth ordinal element b[k]. The depth value d[j] is less than the ordinal element b[k] (i.e., 6<9) and, since the LEAF level is presently being searched, the correct entry corresponding to search key 10011001 has been found.

At this point, the pointers index ps is incremented by the counts index c (i.e., 19+4=23) at step 13. This provides the total of non-NIL entries previous to and including entry 1584. The 23 is used to select the twenty-third entry in the pointers entries 1536a which contains the referencable index, or pointer, to the correct data item in storage container 1539.

7) Bulk Process Procedure

Figure 13:
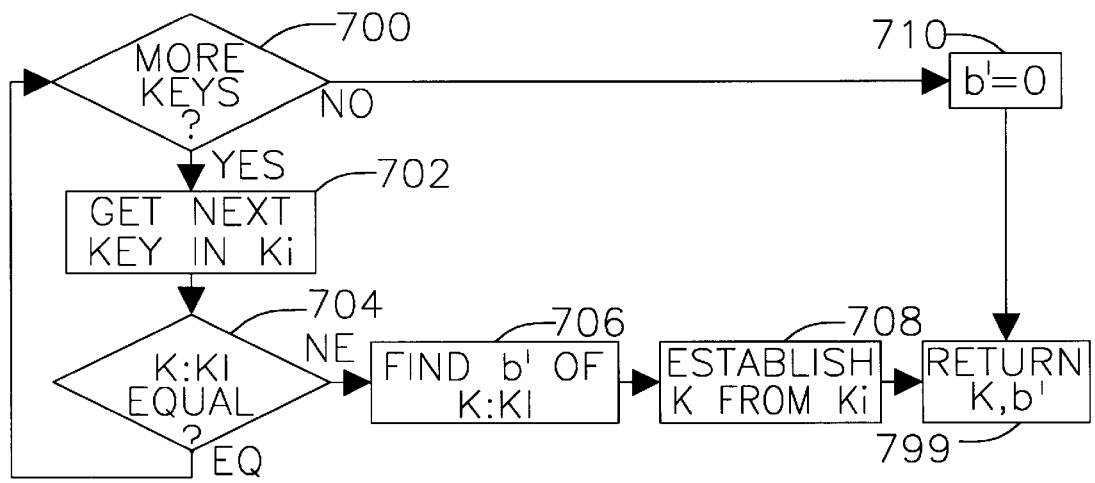
FIG. 13 is a figure of the Bulk Process Procedure of the present invention.

The Bulk Process Procedure which obtains the next key to process within the buffer referred to in FIGS. 8 and 9 is depicted in FIG. 13. Its purpose is to fetch the next key Ki to process in the buffer in memory 8 and determine the distinction bit between the previous key K and the next key Ki.

The procedure determines whether there are more keys within the buffer (700). If more keys within the buffer exist, the next key in the buffer to process in sequence is fetched into Ki (702). Next, a determination as to whether the prior key K and the present key Ki to be processed are equal (704). Since the search keys to be sequentially processed are sorted in the buffer in lexical order, the preferred embodiment is able to determine when a duplicate key exists and not process this search key. Therefore, if this step determines that the two keys are equal, a feedback loop to step 700 is performed. If the two keys are determined to not be equal NE, then the distinction bit of the two keys is found (706). The preferred embodiment then establishes the present key K; in other words, the program moves the new key Ki to be processed into the present key variable K (708).

If there are no more keys to be processed within the present buffer, then the distinction bit b' is set to 0, which terminates processing to the ROOT level (710). By doing this, the procedures of the program structure previously described can determine that there are no more keys to process within the buffer, in particular when determining whether the next key is within the key interval of the present index block in steps 218, 328, 414, 524, and 534. Finally, the procedure returns to its calling routine with the value of the distinction bit b' and the new key K (799).

8) Reset bK Function

Figure 14:
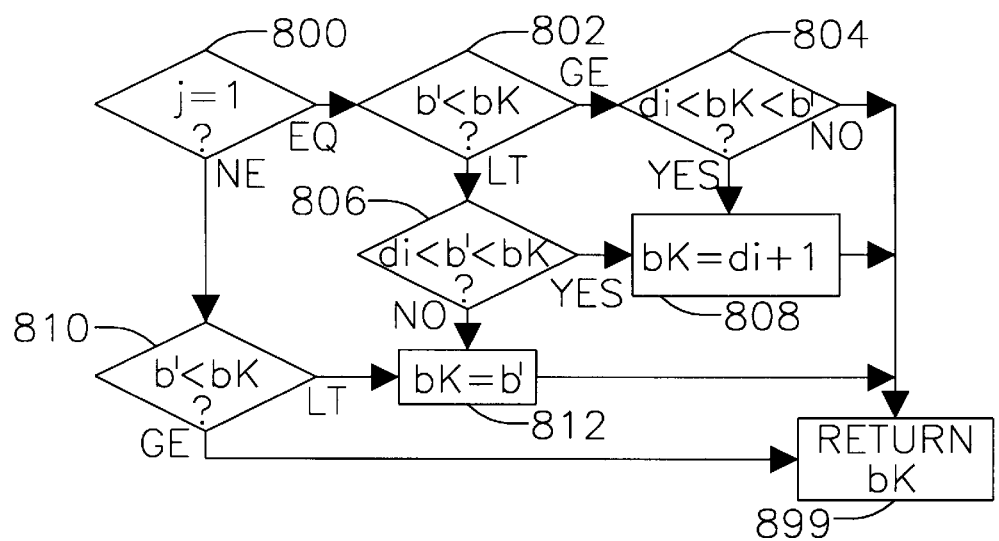
FIG. 14 is a figure of the Reset bK function of the present invention.

Now, the Reset bK Function referenced in FIGS. 8, 9, 10 and 11 is illustrated in detail in FIG. 14. This procedure determines the key bit position bK to resume sequential processing for the present search key. The procedure is able to determine the key bit position since the search keys processed in sequence are in lexical order within the buffer. This property of an ordered sequence allows the preferred embodiment to function as designed. The procedure first determines whether the present index j to the current entry ej is the first in the current index block (800). If so, the distinction bit b' is compared to the present key bit position bK (802). If it is at least as large as the key bit position, the key bit position bK is compared to the trailing variable di and the distinction bit b' (804).

A comparison of the distinction bit b' to the trailing variable di, an input variable to the Reset bK Function, and the present key bit position bK is made (806). If the trailing variable di is less than the distinction bit b' which is less than current key bit position bK, then key bit position bK is set to the trailing variable di plus 1 (808).

If step 800 determines that the present index j to the depths entries is not 1 NE, a determination is made as to whether the distinction bit b' is less than the present key bit position bK (810). If so, the key bit position bK is set to the value of the distinction bit b' (812). Regardless, the value of the key bit position bK is returned (899).

9) Add Depth Procedure

The Add Depth Procedure, which is called by step 320 from the Leaf Insert Procedure, is illustrated in FIG. 15. Its purpose is to determine the correct placement of the index entry for storing the indexing information of a present search key relative to the located entry wherein the search key belongs in the key interval defined by the entry by adding an entry or entries to the current index block. This occurs since the present search key and a prior index key both belong in the same key interval.

To determine the correct placement, the program must determine the depth of the leaf node associated with the located entry and the previously indexed key in a conceptual 0-complete tree, such as the tree 1430 represented in FIG. 2b. This is not recorded in the $C_0$-tree representation. Only the depths of bounding nodes are recorded in the entries. The depth of the leaf node in a conceptual 0-complete tree, as depicted in FIG. 2b, can be determined by the definition of a compact 0-complete tree. The procedure first determines whether the current entry ej is the first in an index block (900). If not, then the depth of the present entry, d[j], in the index block is compared to the depth of the prior entry, d[j−1] (902). Based on this comparison, if the depth of the located entry is less than LT the depth of the prior entry, then the depth li of the leaf node in the conceptual 0-complete tree is set equal to the depth of the previous entry in the index block, d[j−1] (908). If the depth of the located entry is greater than GT, the depth li of the leaf node in the conceptual 0-complete tree is set equal to the depth of the present entry d[j] (906). Finally, if the located entry is the first in the index block, the actual depth li of the leaf in the conceptual 0-complete tree is set equal to the present trailing variable di, which is the depth value of the previous entry of the parent index block (904).

Next, an index variable i is set to the current index j to the index block entries and the distinction bit b' of the present key K being processed and the key Ki indexed by the located entry is determined (910). If the distinction bit b' is less than the depth li of the leaf in the conceptual 0-complete tree (912), then the index entry to be added follows the located entry in the pre-order sequence. More entries must be added to the present tree structure in order to preserve a distinction between the access paths of the present search key and the key of the located entry. To ensure that the conceptual tree is still 0-complete, it may be necessary to add NIL entries wherein the indicator bit is set to true.

The ordinal element b[k] of the search key is obtained that is greater than the depth li of the leaf in the conceptual 0-complete tree plus one. The presently indexed ordinal element b[k] is then compared to the distinction bit b' (918). If it is less than LT the distinction bit b', an entry is inserted to the current index block before the presently indexed entry ei (924). The depth value of the newly inserted indexed entry ei is set to the currently indexed ordinal position b[k] of the current search key, and the indicator of the presently indexed entry ei is set to T signifying a NIL entry (932). The index k to the ordinal elements of the current search key is incremented (938). Next, an index i to the entry of the present index block is incremented (940) and the loop continues at step 918. If the present key K being processed is greater than the key Ki previously indexed by the located entry (920), the flag f is set to 1 (922). If it is less than, the flag f is set to zero (926). An entry is then inserted before the presently indexed entry ei (930). The depth value of the newly inserted indexed entry ei is set to the distinction bit b' and the indicator of the presently indexed entry is set to non-NIL or (F) (934) and the procedure returns the flag f to the calling routine (999).

10) Split Routines

The method for splitting an index block will now be described with particular reference to splitting an index block after determining the number of entries in the index block is greater than a predetermined full index block number and splitting a block after determining that the number of entries is greater than a threshold maximum number.

10a) Split Root Procedure

Figure 16A:
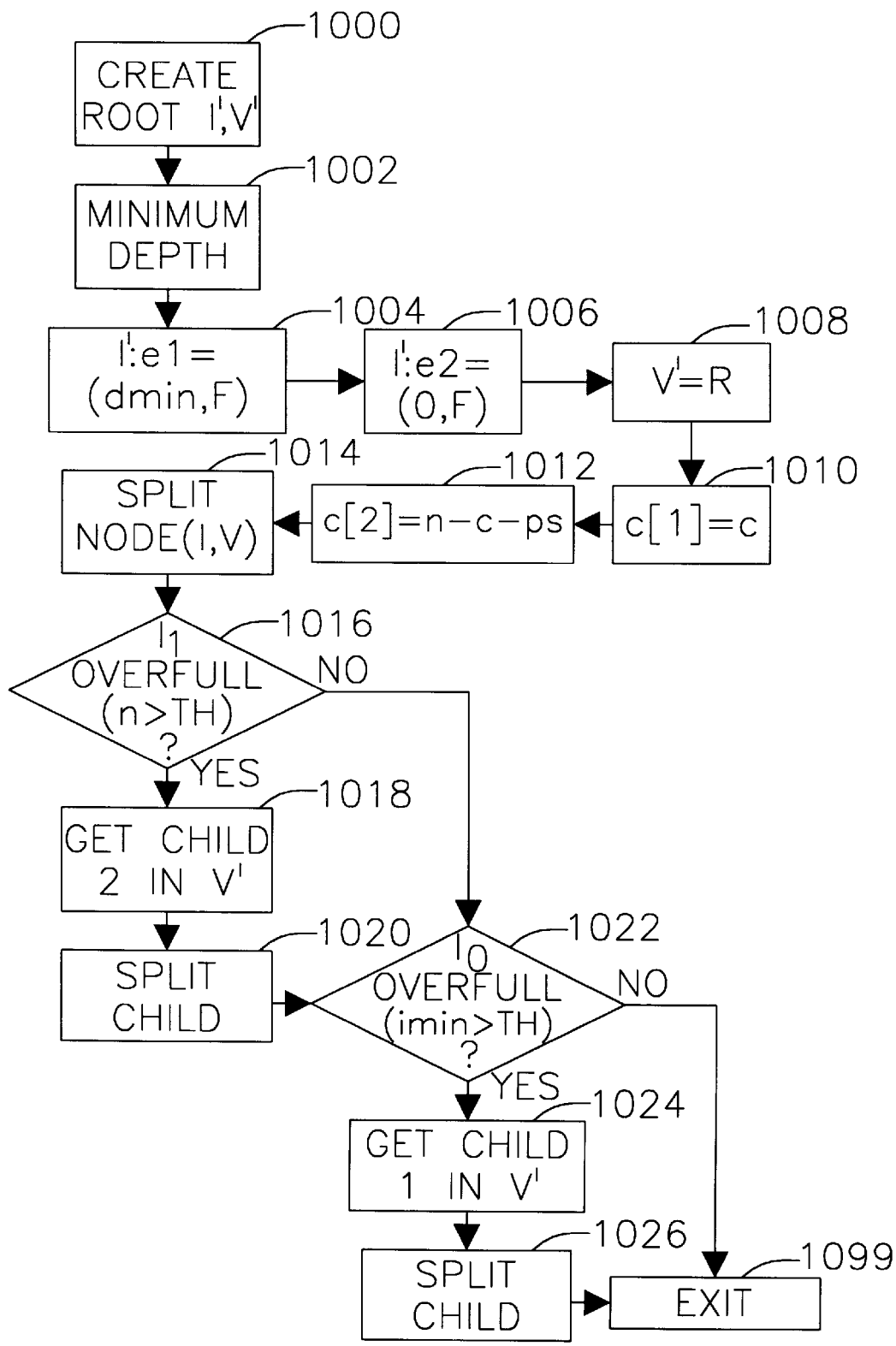
FIG. 16a is a flow chart of a Split Root Procedure of the present invention.

The Split Root Procedure is illustrated in FIG. 16a and an example of a root node being split is depicted in FIG. 16b and 16c. The example in FIG. 16b and 16c will be further detailed with reference to the description of the Procedure in FIG. 16a. The purpose of this procedure is to split the root node and index block when it has reached the predetermined full index block number or when the program determines that an index block has achieved the maximum threshold number of entries TH. The steps of the procedure are as follows.

The old root node R illustrated in FIG. 16b is split to create the new root node R' comprising index block I' and subtree V' in FIG. 16c. The old root node depends from the subtree V' of the new root node. A new root node I', V' is created (1000) and the Minimum Depth Procedure of FIG. 18 to be described is called (1002) in order to determine the depth entry having the minimum depth value in the root index block I to be split. The depth value of the first entry e1 of the new root index block I' is set to the determined minimum depth value dmin of the first index block I of the old root node R (1004), and the depth value of the second entry e2 is set to 0 which is the last depth value of the index block I of the old root R, as in FIG. 16b (1006). The compound subtree V' of the new root R' is linked to the old root node R that is being split (1008). The sum of non-NIL entries depending from each respective subtree is determined and placed in the entries of the counts structure c, wherein the first entry c[1] corresponds to the first subtree V0 (1010) and the second entry c[2] corresponds to the second subtree V1 (1012). However, if the old root node R is now a leaf level, then the counts structure entries c[1] and c[2] simply contain the number of non-NIL entries in their respective index blocks $I_0$ and $I_1$. The procedure Split Node to be described splits the old root node I, V into two nodes and two index blocks returning a value, n, equal to the number of entries in the second index block $I_1$ (1014). If the child or second index block $I_1$ of the two index blocks depending from the new root node R' is overfull, i.e., n>TH (1016), then obtain the second child node (1018), and split this child (1020).

If the first index block $I_0$ depending from the compound subtree V' of the new root node R' is overfull (1022), then the first child node is obtained (1024) and split (1026). Regardless, the procedure is exited (1099). As shown in FIG. 16b and 16c, the old root node R which previously had one index block I has now been split into two index blocks $I_0$ and $I_1$ with respective subtrees $V_0$ and $V_1$.

10b) Split Child Procedure

Figure 17:
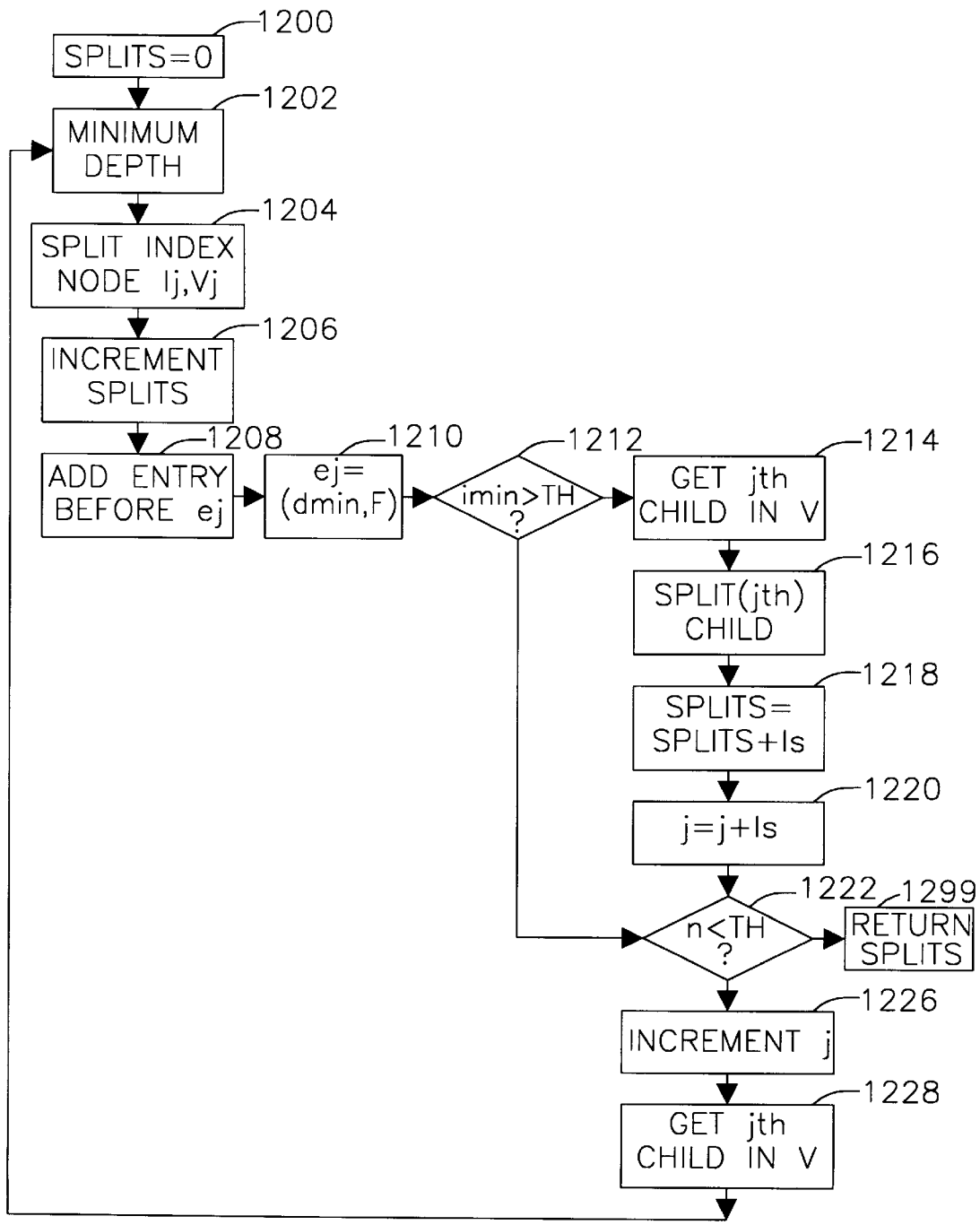
FIG. 17 is a flow chart of the Split Child Procedure of the present invention.

The Split Child Procedure is called from the Split Root Procedure in blocks 1020, 1026, the Split Child Procedure in block 1216 and the Branch Insert Procedure in block 522 when a index block is determined to be overfull. The Procedure is illustrated in FIG. 17. The Procedure continues to split nodes and their respective index blocks as long as an index block of a child node is determined to be overfull. The steps of the procedure are as follows.

A count of the number of splits of index blocks SPLITS is initialized to zero (1200). The minimum depth of the present index block is determined by calling the Minimum Depth Procedure to be described herein (1202). Next, the present index block Ij of the jth node is split into two index blocks Ij and Ij+1 and is split into two subtrees Vj and Vj+1, by the Split Node Procedure described herein (1204). The count of the number of SPLITS is incremented (1206). Next, an entry is inserted before the entry ej in the parent index block of the index block Ij presently being split (1208). The entry ej of the parent index block of the current index block Ij being split has its depth value set to the minimum depth dmin of the current index block being split (determined by the Minimum Depth Procedure) and its indicator set to non-NIL, F (1210).

A determination is made as to whether the index imin of the entry after which the split occurred in the current index block is greater than the predetermined overfull index block number TH (1212). If so, then the jth child, or first of the two nodes created by the present split, is fetched from subtree V (1214) and split (1216). The count of the number of splits is incremented by the number of SPLITS ls in the jth child index block that occurred during the call to split child at step 1216 (1218), as is the index j of the child to split (1220).

A determination is then made as to whether the number of entries n in the newly created block of the split is less than the full index block number TH (1222). If it is not, then the index j of the node and respective index block to be split is incremented (1226) and the new jth child node to be split is fetched from the parent subtree of the previously split node and respective index block (1228). Otherwise, if the number of entries n in the new index block created after the split is less than the full index number TH, the procedure returns to its calling routine with the number of splits, n (1299).

10c) Minimum Depth Procedure

Figure 18:
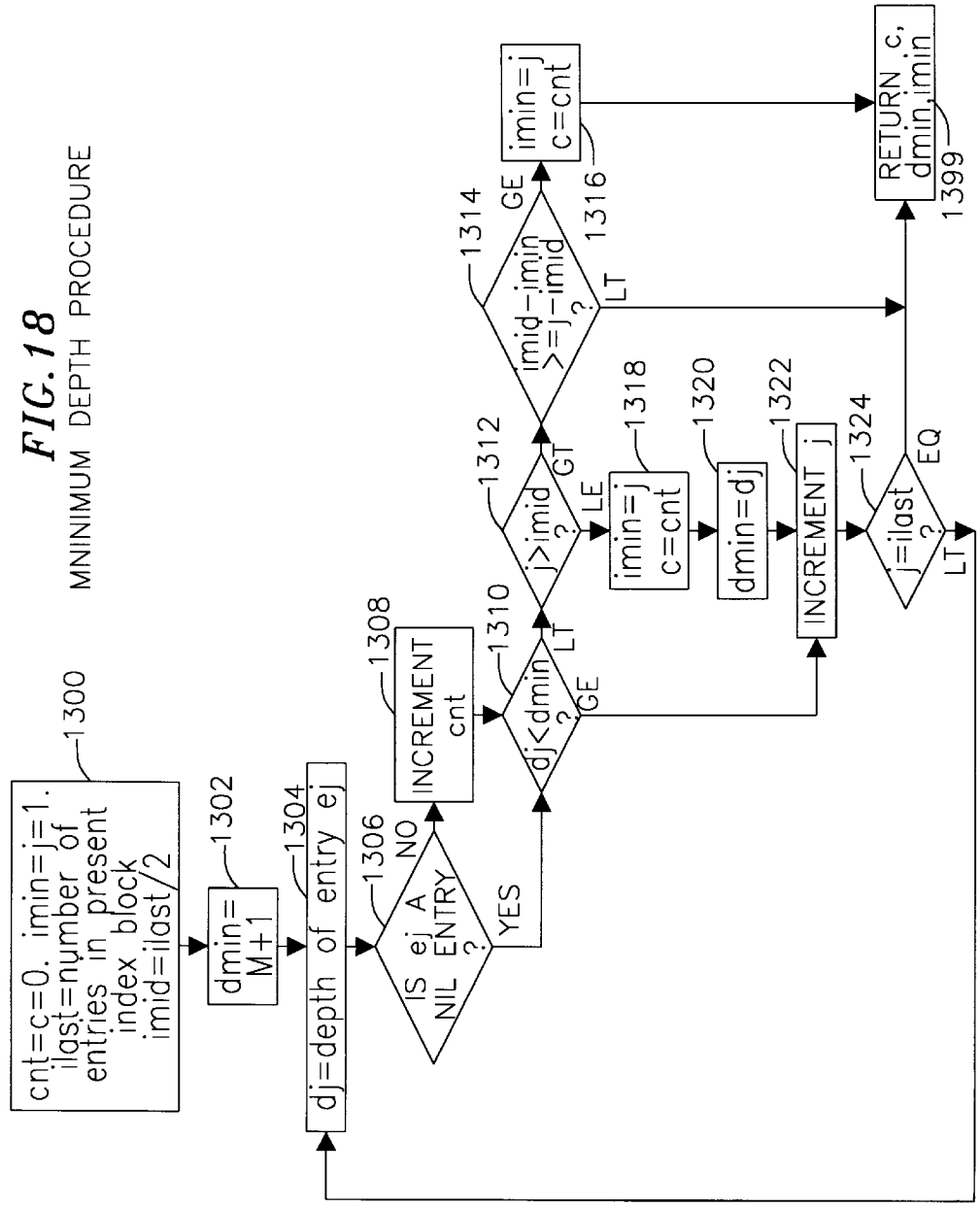
FIG. 18 is a flow chart of the Minimum Depth Procedure of the present invention.

The Minimum Depth Procedure, used by the Split Root Procedure in blocks 1102 and the Split Child Procedure in block 1202, for determining the index of the entry to split after by obtaining the minimum depth value within an index block is performed by the steps illustrated in FIG. 18.

First, the count cnt of non-NIL entries preceding and including the present entry and the count c of non-NIL entries preceding and including the minimum depth entry are initialized. The index imin of the minimum entry and the index j to the index block are also set to 1. The index ilast of the last entry in the index block is set to the number of entries in the present index block. Finally, the index imid of the midpoint of the depth values of the entries of the current index block is set to the halfway point ilast/2 of the index ilast of the last entry (1300). The depth value dmin of the minimum depth entry is set to the maximum length of a search key plus one M+1 (1302). The depth dj of the present entry is assigned (1304). Then, a determination is made as to whether the indicator of the present entry ej is T corresponding to a NIL entry (1306). If not, the count cnt of non-NIL entries preceding and including the present entry is incremented (1308).

A determination is made as to whether the depth value dj of the present entry is less than the value of the minimum depth entry dmin (1310). If it is less than, a further determination is made as to whether the index j to the current index block is greater than the index imid of the midpoint of depth values of the present index block (1312). If the index j to the current index block is less than or equal to the index imid of the midpoint, then the index imin of the minimum entry is set to the index j of the current entry ej and the count c of non-NIL entries preceding and including the minimum depth entry of the present index block is set to the count cnt of non-NIL entries preceding and including the present entry (1318). The depth value dmin of the minimum depth entry is set to the present depth value dj (1320), and the index j to the entry in the current index block is incremented (1322).

If the index j to the current index block entry is greater than the index imid of the midpoint in the current index block at step 1312, then a determination is made as to whether the index imid of the midpoint minus the index imin of the minimum entry is at least as large as the index j of the current index block entry minus the index imid of the midpoint of the depth values of the current index block (1314). If it is at least as large as, then the index imin of the minimum entry is set to the index j to the current index block entry, and the count c of non-NIL entries preceding and including the minimum depth entry is set equal to the count cnt of non-NIL entries preceding and including the present entry ej (1316).

A determination is made following step 1322 as to whether the index j to the current index block entry is equal to the index ilast of the last entry in the present index block (1324). If it is less than, then the loop returns to step 1304. Regardless, the procedure returns to its calling routine with the count c of non-NIL entries preceding and including the minimum depth entry, the index imin of the minimum entry, and the value dmin of the minimum depth entry (1399).

10d) Split Node Procedure

Figure 19:
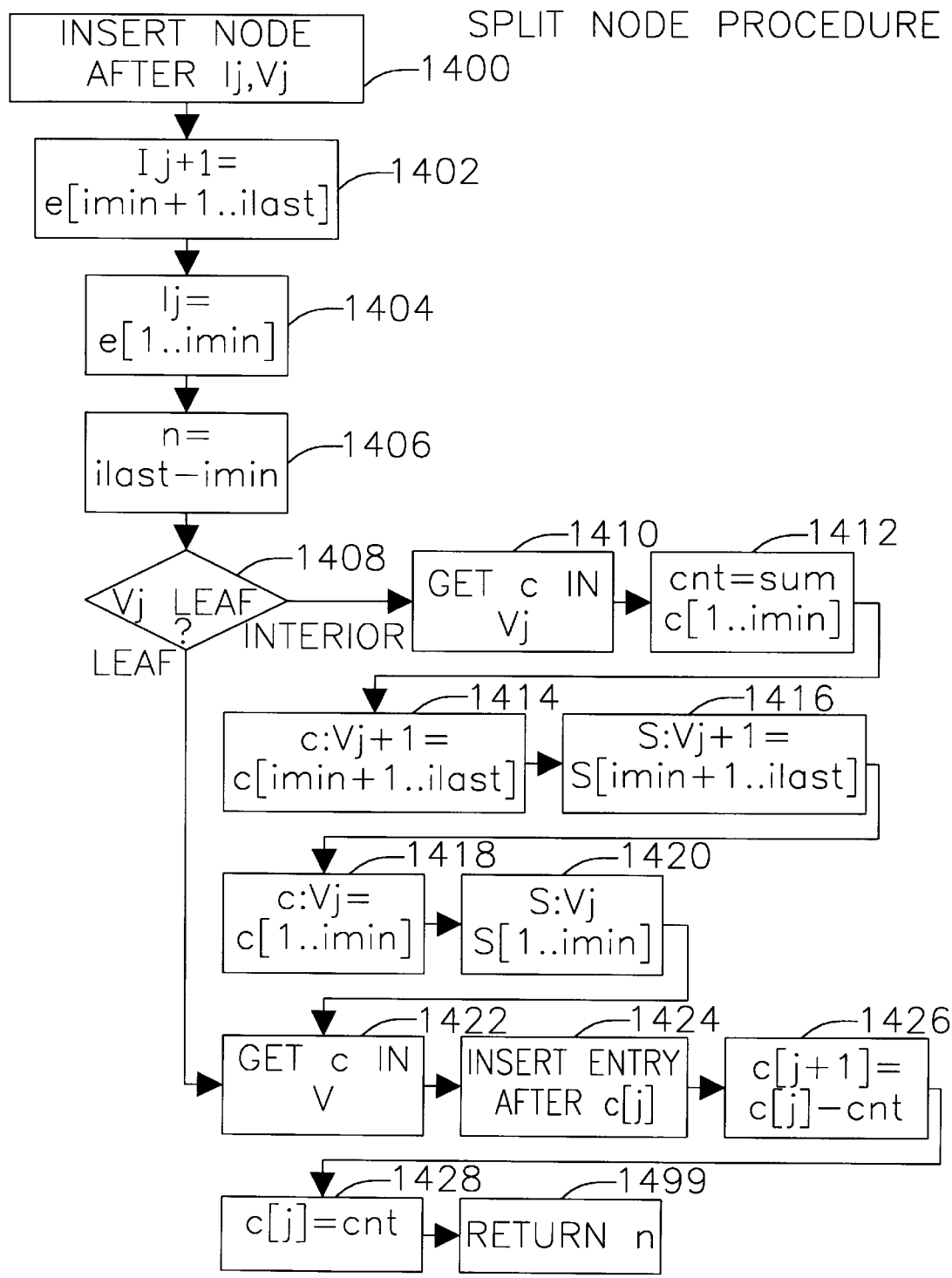
FIG. 19 is a flow chart of the Split Node Procedure of the present invention.

The Split Node Procedure called from the Split Root Procedure in block 1014 and the Split Child Procedure in block 1204 splits the present node and its respective index block at its minimum depth value. The procedure is illustrated in FIG. 19. Two nodes, each having one index block, will be created. The index block I of the first node includes the first entry of the split index block up to the minimum depth entry, and the index block Ij+1 of the second node includes the entry occurring after the minimum depth value up to the final entry of the index block split.

A node Ij+1, Vj+1 is inserted in the present level after the index block Ij and subtree Vj of the node to be split (1400). The newly created index block Ij+1 of the new node will contain entries from the index block Ij to be split starting from the entry $e_{imin+1}$ occurring after the minimum depth value up to the last entry $e_{ilast}$ in the index block to be split (1402). The index block Ij to be split will be updated to contain its previous first entry up to the entry $e_{imin}$ containing the minimum depth value (1404). The number n of entries in the newly created index block Ij+1 is set to the index ilast of the number of entries in the present index block Ij to be split minus the index imin of the minimum depth entry to split after (1406).

The procedure then determines whether the node to be split is a LEAF type by checking the subtree Vj (1408). If it is not and the node type is INTERIOR, then the counts structure c including the counts elements in the subtree Vj of the node to be split is fetched (1410). The number cnt of non-NIL entries preceding and including the minimum depth entry is set equal to the summation of the first element of the counts structure c up to the element of the count structure indexed by the index imin of the entry to split after (1412). The count structure for the subtrees Vj+1 of the newly created node contains the elements of the count structure of the node split indexed by the index imin+1 of the entry to split after up to the index ilast of the last entry in the index block being split (1414). The subtrees of j+1 of the newly created node are set to the subtree elements of the split node indexed by the index imin+1 of the entry to split after up to the index ilast of the number of entries in the index block Ij of the presently split node (1416).

The count structure associated with the subtree Vj of the split node is adjusted to include the first element through the element indexed by imin of the node to split at (1418). Moreover, the subtrees of the jth node of the split node are adjusted to include the elements indexed by the first element up to the index imin of the entry to split at (1420). The count structure in the present level of the node to be split is fetched (1422). An entry is inserted in the counts structure after the element indexed by the index j of the subtree to split (1424). This newly created element c[j+1] is assigned the count c[j] of non-NIL entries in the preceding element of the counts structure minus the number cnt of non-NIL entries preceding and including the minimum depth entry (1426). The element c[j] of the counts structure indexed by the index j of the subtree to split is assigned the number cnt of non-NIL entries preceding and including the minimum depth entry (1428). The procedure then returns the number n of entries in the newly created index block (1499).

The program structure of the preferred embodiment of the present invention has been described in detail above, with reference to the relevant procedures. While the invention has been particularly shown and described as referenced to the embodiments thereof, it will be understood by those skilled in the art that the foregoing and other changes in form and detail may be made without departing from the scope and spirit of the invention.

TABLE 1

| Leaf | Key Interval of Leaf Node | Bounding Node Node - Depth |
|---|---|---|
| H | 00000000–00100000 | I - 3 |
| I | 00100000–01000000 | e - 2 |
| V | 01000000–01000100 | W - 6 |
| W | 01000100–10000000 | c - 1 |
| L | 10000000–10100000 | m - 3 |
| T | 10100000–10101000 | u - 5 |
| Z | 10101000–10101010 | A' - 7 |
| A' | 10101010–10110000 | Q - 4 |
| Q | 10110000–11111111 | - 0 |

TABLE 2

| Procedure | Inputs | Variables | Outputs |
|---|---|---|---|
| Sequential Processing Procedure FIG. 7 | p: a vector P=p<[i]> of pointers ($p_i$ is a pointer to a data item, or a record, with key Ki, such that the value of key Ki is less than the value of key Ki + 1, where i denotes the lexical position of the key Ki). I: Index (root) block of depth entries of the $C_0$-trie storage structure. Let ej=(dj, Nj) denote the jth entry in an index block, in which dj denotes the depth of the bounding node in a conceptual 0-complete tree and where Nj indicates a NIL indicator. V: Pointer to a subtree of index block I. If V is empty, each ej in I is related to a leaf (data item or record). | Ki: search key of p[i]. ps: sum of non-NIL entries in previous index blocks and the indicator of an empty string in the stored data items (global variable - not scoped). di: trailing variable of present index block. dj: depth of bounding node. bK: key bit position of search key being processed. K: present search key. | |

TABLE 2-continued

| Procedure | Inputs | Variables | Outputs |
|---|---|---|---|
| | Otherwise, V is a pointer to a structure consisting of (1) a sequence of S = (Ij, Vj) entries corresponding to each ej entry and (2) a sequence C = c<[j]> of the number of non-NIL entries in each Vjth subtree. buffer of search keys flag: loading request. | | |
| Leaf Search Procedure FIG. 8 | dj: depth of bounding node. e[ ]: entries for current index block. bK: current bit position in key K. K: search key. b: an array B = <b[K]> of sorted 1-bit positions in key K. ps: sum of non-NIL entries in previous siblings of this node. | j: index of entry. c: number of non-NIL entries in current index block preceding and including entry ej. d': depth of bounding node. | b': distinction bit of previous key and present key. bK: terminating bit position in key K (where last iteration of Search Depth concluded processing). |
| Leaf Insert Procedure FIG. 9 | di: trailing variable. dj: depth of bounding node. K: search key. e[ ]: entries for the current index block. bK: current bit position in key K. b: an array B = <b[k]> of sorted 1-bit positions in key K. n=0: count of new entries (pointers/keys) added to p[ ]. ps: sum of non-NIL entries in previous siblings of this node. | j: index of entries. c: number of non-NIL entries in current index block preceding and including entry ej. d': depth of bounding node. f: flag indicating present search key follows previously indexed key. | n: count of new keys added to child index block. b': distinction bit of previous key and present key. bK: terminating bit position in key K (where last iteration of Search Depths concluded Processing). |
| Branch Search Procedure FIG. 10 | dj: depth of bounding node. e[ ], V: index block entries and subtree for current node. bK: current bit position in key K. K: search key. b: an array B = <b[k]> of sorted 1-bit positions in key K. ps: sum of non-NIL entries in previous siblings of this node. | j: index of entries. c: number of non-NIL entries in current index block. d': depth of bounding node. di: depth of entry ej−1. dj: depth of entry ej. | b': distinction bit of previous key and present key. bK: terminating bit position in key K (where last iteration of Search Depths concluded processing). |
| Branch Insert Procedure FIG. 11 | di: trailing variable. e[ ], V: index block entries and subtree of current node. dj: depth of bounding node. b: an array B = <b[k]> of sorted in 1-bit positions in key K. K: search key. bK: current bit position in key K. ps: sum of non-NIL entries in previous siblings of this node. | j: index of entry. d': depth of bounding node. n: count of new keys added to child index block. cn=0: count of new keys added to p[ ] for current index block. | bK: terminating key bit position in K (where last iteration of Search Depths concluded processing). n: count of new keys added to child index block. b': distinction bit of previous key and present key. |
| Search Depth Procedure FIG. 12 | d: a sequence L=d<[j]> of depth entries of the bounding nodes in a 0-complete tree. j: an index of the entry | k: index variable. | bK: terminating key bit position in K (where last iteration of Search Depths concluded). |
| | in sequence L at which to begin/resume the search at. b: an array B = <b[k]> of sorted 1-bit positions in key K. bK: key bit position to begin search from. Passed on recursive call and reset for each new key. c: an integer of the number non-NIL entries in the current index block preceding and including entry ej. | | j: index of entry ej whose interval contains key K. c: number of non-NIL entries in current index block preceding and including ej. |
| Bulk Process Procedure FIG. 13 | K: search key just processed. | Ki: next search key from buffer. | K: new search key. b': distinction bit of difference between the previous key and new key. |
| Reset bK Function FIG. 14 | bK: key bit position search depth concluded at. j: index of entry ej Search Depth concluded at. di: trailing variable. b': first bit of difference between Key K and previous key in key K. | | bK: present bit position in key K to resume processing at. |
| Add Depth(s) Procedure FIG. 15 | di: trailing variable. j: index of depth entry whose interval contains key K. e[ ]: depth entries for current index block. b: an array B = <b[k]> of sorted 1-bit positions in key K. | li: depth of leaf entry in conceptual 0-complete tree. j: index variable to depth entry. k: index in array B. | f: flag denoting present key follows the previously indexed search key. |
| Split Root Procedure FIG. 16 | I: index block of entries to split. R: (C, I, V) at root level. C: count structure of root level (no entries). n: number of entries in I. V: subtree of index block I. | I': new root depth list of index block. V': new root compound vector of index block. imin: index of entry to split after. c: number of non-NIL entries preceding and including e[imin]. | |
| Split Child Procedure FIG. 17 | j: index of subtree to split. I, V: parent index block and subtree index block. ej: entry corresponding to Ij, Vj in index block. | imin: index of entry to split after in Ij. dmin: minimum depth of entry e_{imin} split: number of splits. ls: number of left splits | splits: number of splits in index block I. |
| Minimum Depth Procedure FIG. 18 | | imid: index of midpoint entry in index block I. imin: index of minimum entry. ilast: index of | imin: index of entry to split after in Ij. dmin: minimum depth of entry e_{imin} c: number of non-NIL entries |

TABLE 2-continued

| Procedure | Inputs | Variables | Outputs |
|---|---|---|---|
| | | last entry in index block I. dmin: value of the minimum depth entry $e_{imin}$ cnt: count of non-NIL entries preceding and including entry $e_{imin}$ c: count of non-NIL entries preceding and including entry $e_{imin}$ | preceding and including $e_{imin}$ |
| Split Node Procedure FIG. 19 | j: index of subtree to split. V: compound vector of index block containing (Ij, Vj). Ij: index block to split. Vj: subtree for index block Ij. imin: index of entry to split after. cnt: number of non-NIL entries preceding and including $e_{imin}$ ilast: index of last entry of Ij. | c: structure of counts of non-NIL entries in subtree level V. | n: number of entries in new $I_{j+1}$. |

TABLE 3

| Macro | Function |
|---|---|
| NIL_ENTRY (d) | create a non-NIL entry from depth value, d. |
| ENTRY_ISNIL (e) | TRUE if entry e is a non-NIL entry. |
| DEPTH_ofENTRY (e) | extract the depth, d, of entry e. |

TABLE 4

Search Key = 10011001
b[K] = <1, 4, 5, 8, 9>

| Steps | Level | k | b[K] | j | d[j] | c | ps | c + ps |
|---|---|---|---|---|---|---|---|---|
| 1 | 0 | 1 | 1 | 1 | 2 | | | |
| 2 | (ROOT) | 1 | 1 | 2 | 1 | | | |
| 3 | | 2 | 4 | 3 | 0 | | | |
| 4 | | | | | | | 8 + 6 = 14 | |
| 5 | 1 | 2 | 4 | 1 | 4 | | | |
| 6 | (INTERI- | 3 | 5 | 2 | 2 | | | |

TABLE 4-continued

Search Key = 10011001
b[K] = <1, 4, 5, 8, 9>

| Steps | Level | k | b[K] | j | d[j] | c | ps | c + ps |
|---|---|---|---|---|---|---|---|---|
| | OR - 3rd Node) | | | | | | | |
| 7 | | | | | | | 14 + 5 = 19 | |
| 8 | 2 | 3 | 5 | 1 | 6 | 0 | | |
| 9 | (LEAF - 2nd Node) | 3 | 5 | 2 | 7 | 1 | | |
| 10 | | 3 | 5 | 3 | 5 | 2 | | |
| 11 | | 4 | 8 | 4 | 8 | 3 | | |
| 12 | | 5 | 9 | 5 | 6 | 4 | | |
| 13 | | | | | | | | 23 |

I claim:

1. A hierarchical tree structure for storage of data in a storage means of a computer system, the tree structure comprising:

at least one level;

entry means for interconnecting said tree structure, at least some of which entry means are linked to the data; and a stored count of said entry means linked to said data.

2. A hierarchical tree structure for storage of data in a storage means of a computer system, the tree structure comprising:

at least one level;

entry means for interconnecting said tree structure, at least some of which means are linked to the data; and a pointer means for linking said data to said entry.

3. A hierarchical tree structure for storage of data in a storage means of a computer system, the tree structure comprising:

at least one level;

entry means for interconnecting said tree structure, at least some of which entry means are linked to the data, wherein each entry means comprises a depth value element indexing such entry means in said tree structure and a data present indicator.

4. A hierarchical tree structure for storage of data in a storage means of a computer system, the tree structure comprising:

at least one level;

entry means for interconnecting said tree structure, at least some of which entry means are linked to the data, wherein the tree structure further comprises at least one index block means for defining a key interval range.

* * * * *

UNITED STATES PATENT AND TRADEMARK OFFICE
CERTIFICATE OF CORRECTION

PATENT NO. : 5,930,805
DATED : July 27, 1999
INVENTOR(S) : Jean A. Marquis

It is certified that error appears in the above-identified patent and that said Letters Patent is hereby corrected as shown below:

On the title page, item [56] References Cited, Other Publications, page 2, column 1, line 26, the reference "Orlandic Ratko" should read -- Orlandic Ratko. "Design, Analysis and Applications of Compact 0-Complete Trees," May 1989, p. 185. --.

Other Publications, page 2, column 2, lines 12-13, delete the following duplicate reference:
"Ratko Orlandic. "Design Analysis and Applications of Compact O-Complete Trees,"185p, May 1989."

Other Publications, page 2, column 2, lines 14-16
Delete the following duplicate reference:
"Biliris. "The Performance of Three Database Storage Structures for Managing Large Objects". AT&T Bell Laboratories. Murray Hill New Jersey, pp. 276-285, 1992."

Column 2, line 49, replace "ordered" with -- order --.
Column 8, line 57, replace "tree as show" with -- tree as shown --.
Column 13, line 13, replace "ucontainer" with -- container --.
Column 19, line 27, replace "structures" with -- structure --.

UNITED STATES PATENT AND TRADEMARK OFFICE
CERTIFICATE OF CORRECTION

PATENT NO. : 5,930,805
DATED : July 27, 1999
INVENTOR(S) : Jean A. Marquis

It is certified that error appears in the above-identified patent and that said Letters Patent is hereby corrected as shown below:

Column 23, line 63, replace "a index" with -- an index --.
Column 26, line 55, in Table 2, under the column "Inputs" replace "$C_o$-trie" with -- $C_o$-tree --.

Signed and Sealed this

Twenty-ninth Day of May, 2001

Attest:

NICHOLAS P. GODICI

*Attesting Officer*    *Acting Director of the United States Patent and Trademark Office*